(12) United States Patent
Chandler et al.

(10) Patent No.: US 11,449,553 B2
(45) Date of Patent: *Sep. 20, 2022

(54) SYSTEMS AND METHODS FOR GENERATING REAL-TIME RECOMMENDATIONS

(71) Applicant: Architecture Technology Corporation, Minneapolis, MN (US)

(72) Inventors: Richard Chandler, Santa Cruz, CA (US); Douglas Sweet, Sunnyvale, CA (US); Paul Davis, Saratoga, CA (US)

(73) Assignee: Architecture Technology Corporation, Minneapolis, MN (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/113,165

(22) Filed: Dec. 7, 2020

(65) Prior Publication Data

US 2021/0089582 A1 Mar. 25, 2021

Related U.S. Application Data

(63) Continuation of application No. 15/947,071, filed on Apr. 6, 2018, now Pat. No. 10,866,989.

(51) Int. Cl.
| | |
|---|---|
| *G06F 7/00* | (2006.01) |
| *G06F 16/901* | (2019.01) |
| *G06K 9/62* | (2022.01) |
| *G06F 16/31* | (2019.01) |
| *G06F 16/9537* | (2019.01) |

(52) U.S. Cl.
CPC ........ *G06F 16/9027* (2019.01); *G06F 16/313* (2019.01); *G06F 16/9537* (2019.01); *G06K 9/623* (2013.01); *G06K 9/6282* (2013.01)

(58) Field of Classification Search
CPC .............. G06F 16/9027; G06F 16/313; G06F 16/9537; G06F 16/9535; G06K 9/623; G06K 9/6282; G06V 20/40
See application file for complete search history.

(56) References Cited

U.S. PATENT DOCUMENTS 6,233,575 B1 * 5/2001 Agrawal ............... G06F 16/355
6,961,954 B1 * 11/2005 Maybury .............. G06F 16/745
725/53

(Continued)

*Primary Examiner* — Mohammed R Uddin
(74) *Attorney, Agent, or Firm* — Key IP Law Group, PLLC

(57) ABSTRACT

A real-time recommendation system includes a non-transitory, computer-readable storage medium having encoded thereon instructions that a processor executes to receive data from data sources that includes one or more data records. The processor then identifies features in data of a data record, extracts and buffers the features, and applies the features to a feature detect mechanism. The feature detect mechanism includes feature detect algorithm and more recommender algorithms that are encapsulated in a feature detection object. The feature detection object may be a Strategy/Composite feature detection object that includes Strategy design patterns. The processor further executes to reject a feature in response to failures of the feature to match at least one of the Strategy design patterns, and in real time, select and install features that match one or more of the Strategy design patterns into one or more recommender algorithms.

32 Claims, 30 Drawing Sheets

(56) References Cited

U.S. PATENT DOCUMENTS

| | | | | |
|---|---|---|---|---|
| 7,644,052 B1* | 1/2010 | Chang | G06N 5/022 | 706/45 |
| 8,090,724 B1* | 1/2012 | Welch | G06F 16/313 | 707/750 |
| 8,612,450 B1* | 12/2013 | Proffit | H04N 21/4828 | 707/755 |
| 8,676,795 B1* | 3/2014 | Durgin | G06F 40/216 | 707/750 |
| 8,798,995 B1* | 8/2014 | Edara | G10L 15/00 | 704/211 |
| 9,449,080 B1* | 9/2016 | Zhang | G06F 16/3346 | |
| 9,594,859 B1* | 3/2017 | Padalia | G06F 30/3323 | |
| 10,410,125 B1* | 9/2019 | Finkelstein | G06F 16/35 | |
| 10,430,481 B2* | 10/2019 | Tikhonov | G06F 16/9536 | |
| 10,467,122 B1* | 11/2019 | Doyle | G06Q 20/207 | |
| 10,489,284 B1* | 11/2019 | Saraf | G06F 11/3495 | |
| 2003/0078899 A1* | 4/2003 | Shanahan | G06F 16/353 | 707/E17.09 |
| 2004/0111438 A1* | 6/2004 | Chitrapura | G06F 16/00 | |
| 2004/0120557 A1* | 6/2004 | Sabol | G09B 23/28 | 382/128 |
| 2008/0260253 A1* | 10/2008 | Miyazaki | G06F 16/639 | 382/190 |
| 2009/0299998 A1* | 12/2009 | Kim | G06F 16/951 | 707/999.005 |
| 2010/0205541 A1* | 8/2010 | Rapaport | G06Q 30/02 | 715/753 |
| 2010/0235313 A1* | 9/2010 | Rea | G06F 16/9535 | 706/54 |
| 2011/0213655 A1* | 9/2011 | Henkin | G06Q 30/00 | 707/E17.061 |
| 2011/0246465 A1* | 10/2011 | Koister | G06F 16/353 | 707/E17.014 |
| 2011/0307469 A1* | 12/2011 | Ghosh | G06F 16/242 | 707/711 |
| 2012/0265816 A1* | 10/2012 | Picault | G06F 16/337 | 709/204 |
| 2013/0066973 A1* | 3/2013 | Macadaan | G06F 16/248 | 709/204 |
| 2013/0136253 A1* | 5/2013 | Liberman Ben-Ami | H04M 3/5191 | 379/265.09 |
| 2013/0138671 A1* | 5/2013 | Cleaver | G06Q 10/101 | 707/E17.014 |
| 2013/0290110 A1* | 10/2013 | LuVogt | G06Q 30/02 | 705/14.66 |
| 2014/0004892 A1* | 1/2014 | Murynets | H04L 51/12 | 455/466 |
| 2014/0172501 A1* | 6/2014 | Meshulam | G06Q 30/0201 | 705/7.29 |
| 2014/0188769 A1* | 7/2014 | Lim | G06F 16/24578 | 706/12 |
| 2015/0049955 A1* | 2/2015 | Stoeffler | G06F 16/5838 | 382/220 |
| 2015/0120722 A1* | 4/2015 | Mart N Mart Nez | G06F 16/9535 | 707/733 |
| 2015/0248651 A1* | 9/2015 | Akutagawa | H04L 51/14 | 705/7.19 |
| 2015/0278916 A1* | 10/2015 | Stoll | G06Q 30/0609 | 705/26.7 |
| 2016/0179816 A1* | 6/2016 | Glover | G06F 16/24578 | 707/767 |
| 2017/0180294 A1* | 6/2017 | Milligan | H04L 67/20 | |
| 2017/0255621 A1* | 9/2017 | Kenthapadi | G06F 16/93 | |
| 2017/0308589 A1* | 10/2017 | Liu | G06F 16/248 | |

* cited by examiner

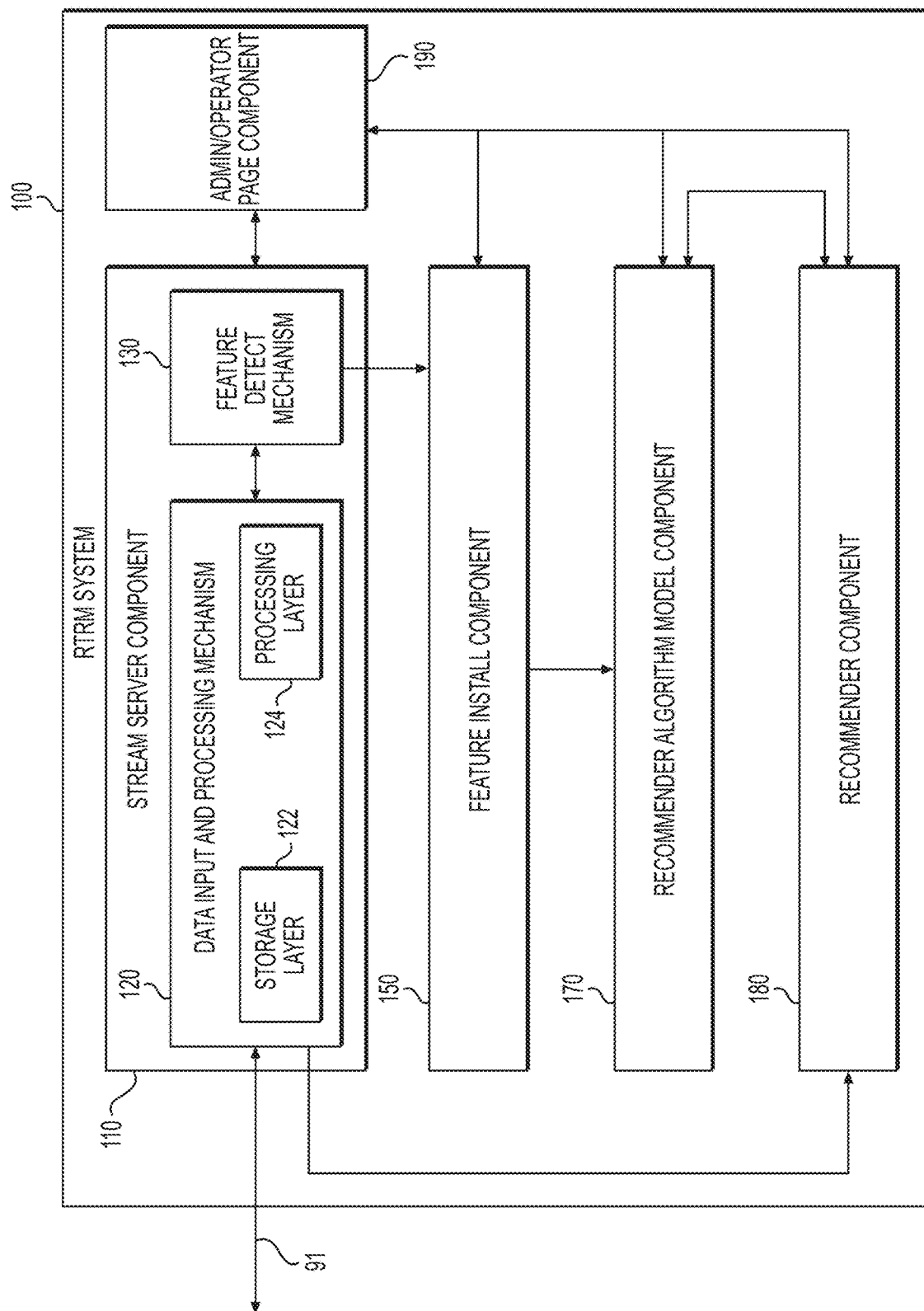

(CONT.2)

```
public interface CheckStrategy
{
    public boolean check(Strings);    ~710
}
```

FIG. 7A

```
public class listname implements CheckStrategy
{
    public boolean check(String s)
    {
        if( s == null || s.length() == 0) return false;
        return s.termplistname(0) == 'listname';    ~720
    }
}
```

FIG. 7B

```
public void saveWhen(String filename, CheckStrategy which) throws IOException
{
    BufferedReader infile = new BufferedReader(new FileReader(filename));
    String buffer = null;
    while((buffer = infile.readLine()) != null)
    {
        StringTokenizer words = new StringTokenizer(buffer);
        while( words.hasMoreTokens())
        {
            String word = words.nextToken();
            if (which.check(word)) System.out.saveln(word);
        }
    }
}
```

```
class AndStrategyComposite implements CheckStrategy
{
    public void addStrategy(CheckStrategy s) {tests.addElement(s);} public boolean check(String s)
    {
        java.util.Enumeration e = tests.elements();
        while (e.hasMoreElements())
        {
            CheckStrategy strategy = (CheckStrategy)e.nextElement();
            if( ! strategy.check(s) ) return false;
        }
        return true;
    }
}
```

```
AndStrategyComposite longWordsThatStartsWithH = new AndStrategyComposite();
longWordsThatStartWithH.addStrategy(new LongerThan(8));
longWordsThatStartWithH.addStrategy(new StartWithH());
...
saveWhen("word8.txt", longWordsThatStartWithH);
```

750

760

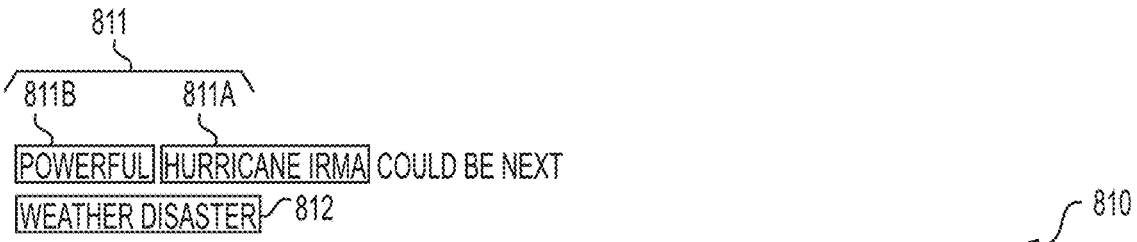

FIG. 8A

(CNN — WHILE MUCH ATTENTION REMAINS ON TEXAS AND THE DESTRUCTION LEFT BY HURRICANE HARVEY AND ITS HISTORIC RAINFALL, POWERFUL HURRICANE IRMA IS RAPIDLY INTENSIFYING IN THE OPEN ATLANTIC AND POSES A MAJOR THREAT TO THE CARIBBEAN AND POTENTIALLY TO THE UNITED STATES NEXT WEEK.

FIG. 8B

SUCH EXPLOSIVE STRENGTHENING IS KNOW AS "RAPID INTENSIFICATION," DEFINED BY THE NATIONAL HURRICANE CENTER AS HAVING ITS WIND SPEED INCREASE AT LEAST 30 KNOTS (35 MPH) IN 24 HOURS.

FIG. 8C

IRMA IS A CLASSIC "CAPE VERDE HURRICANE," A TYPE OF HURRICANE THAT FORMS IN THE FAR EASTERN ATLANTIC, NEAR THE CAPE VERDE ISLANDS (NOW KNOWN AS THE CABO VERDE ISLANDS), THEN TRACKS ALL THE WAY ACROSS THE ATLANTIC. CAPE VERDE STORMS FREQUENTLY BECOME SOME OF THE LARGEST AND MOST INTENSE HURRICANES. EXAMPLES ARE HURRICANE HUGO, HURRICANE FLOYD, AND HURRICANE IVAN ⸺ 840

*FIG. 8D*

HURRICANE IRMA IS FORECAST TO CONTINUE TO STRENGTHEN AS IT MOVES WESTWARD OVER THE NEXT FIVE DAYS, AND THE OFFICIAL FORECAST FROM THE NATIONAL HURRICANE CENTER PUTS A DANGEROUS CATEGORY 4 HURRICANE IRMA ON THE DOORSTEP OF THE CARIBBEAN BY THE END OF THE FIVE-DAY FORECAST ON WEDNESDAY. ⸺ 850

*FIG. 8E*

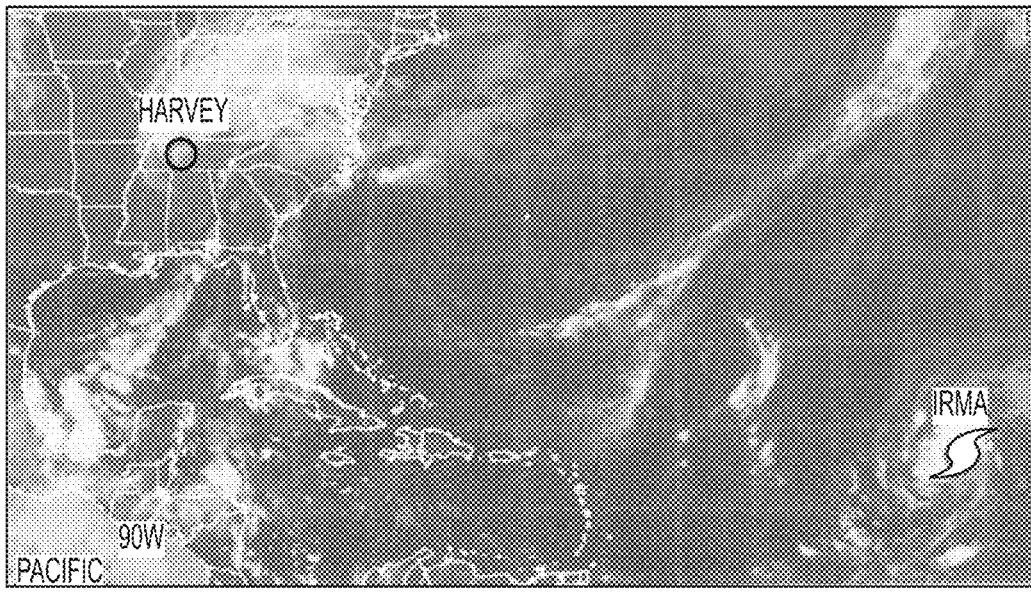

*FIG. 8F*

NHC ATLANTIC OPS
@NHC_ATLANTIC

IRMA HAS CONTINUED TO STRENGTHEN OVER THE EASTERN ATLANTIC AND IS NOW A MAJOR HURRICANE. DETAILS AT HURRICANES.GOV

3:40 PM - AUG 31, 2017

♡ 814   ◯ 1,502 PEOPLE ARE TALKING ABOUT THIS

SYSTEMS AND METHODS FOR GENERATING REAL-TIME RECOMMENDATIONS

RELATED APPLICATIONS

This application is a continuation of U.S. application Ser. No. 15/947,071 filed Apr. 6, 2018, entitled "REAL TIME RECOMMENDER MODELING SYSTEM, METHODS OF CONSTRUCTION, AND METHODS OF USE," now U.S. Pat. No. 10,866,989, issued Dec. 15, 2020, the disclosure of which is hereby incorporated by reference.

BACKGROUND

Information filtering delivers information that a user likely will find interesting or useful. An information filtering system may help a user by filtering a data source and delivering relevant information. In this sense, a search engine may be considered an information filtering system. When the delivered information comes in the form of suggestions, an information filtering system may be referred to as a recommender system. A recommender system may provide recommendations to help the user find items (e.g., information, goods, or services) that may be most suitable to the user's interests (tastes, desires, and needs). Items may be viewed or acquired by a user. A recommender system may provide predictions as to items a user may view or acquire. Some recommender systems base recommendations on the user's attributes, especially in comparison to attributes of other, similar users. Other recommender systems base recommendations on item features. Still other recommender systems base recommendations on a combination of user attribute comparisons and item features.

Because of their success in connecting users to information, products, and services, recommender systems may be an important aspect of a business or other organization. Recommender systems may reduce information overload and provide customized item access. Recommender systems may help businesses retain customers and enhance revenues. Recommender systems include customized search engines, handcrafted content indices, personalized shopping agents on e-commerce Web sites, and news-on-demand services. The scope of such personalization extends to many different forms of information content and delivery, not just Web pages. The underlying algorithms and techniques, in turn, range from simple keyword matching of user profiles, to collaborative filtering, to more sophisticated forms of data mining, such as clustering Web server logs. Recommender systems often involve two modes (typically people (users) and items (e.g., movies and books)) and have been employed in domains that focus on harnessing online information resources, information aggregation, social schemes for decision making, and user interfaces. A recurring aspect of many recommender systems is that recommendations are implicitly cast as a task of learning mappings (from users to recommended items, for example) or of filling in empty cells in a matrix (of user preferences, for example). These processes typically are performed offline, and thus the basis by which current recommender systems operate are static. For example, because different users have different interests, a recommender system may be personalized to accommodate the individual user's interests. This personalization may require gathering feedback from users to make user preference profiles, followed by offline processing and model population.

Two common recommender approaches may be referred to as content filtering and collaborative filtering. Content-based recommender systems select items based on correlations between item's content and the user's preferences. The content of each item is represented as a set of elements, descriptors, or terms (i.e., features or potential features); for example, words that occur in a document. The user profile is represented with the same terms and built up by analyzing the content of items that have been viewed or acquired by the user. Obviously, a new user will have no user profile, which leads to a situation known as the "cold start" problem.

Collaborative recommender systems suggest items based on correlations between and among users who have similar preferences. Collaborative filtering relies on user history information to predict users' unknown preferences. Collaborative recommender systems generally employ one or more approaches or methods: matrix factorization methods and neighborhood-based methods. Matrix factorization is able to model the influence of various item features and thus improve accuracy. However, matrix factorization makes it difficult to provide explainable recommendation results. Neighborhood-based methods are popular at least because they naturally explain recommendation results (e.g., an item that is similar to items a user previously viewed or acquired or to an item a similar user viewed or acquired). Thus, "neighbors may be other users or other items. Similarity also serves as the basis of weighting neighbors, which helps improve the accuracy of neighborhood-based methods. However, existing similarity computation schemes cannot capture influences from different features, which may limit the accuracy of neighborhood-based methods.

Alternative information filtering approaches include demographic filtering systems that employ demographic information such as age, gender, and education to identify the types of users that may like a certain item; and economic filtering systems that recommend items based on the costs and benefits of producing and viewing them. Examples of economic filtering are systems that adaptively schedule banner advertisements on the Internet. Advertisement systems exist that learn to display ads that will yield the highest possible click-through rate based on the past behavior of the user. Directing ads to a specific population may help Internet providers and advertising agents increase their ad revenues.

Any of the above recommender systems may base part of their recommendations not just on items, but more specifically on item features. A feature is an individual measurable property of an item, such as a Twitter interest. Existing feature selection methods assume that all features are statically pre-computed. Static pre-computation may work for items whose features do not change often; but not all features may be present in advance of reception of a data stream containing the items. Some highly dynamic domains, like news or social media domains, create new, time-sensitive items at a fast rate; these unfolding news events (items) have features that may become stale with time. For example, a request from a user to a recommender system for news about a new hurricane, using a newly created tag or name by social media "Irma", may not return relative articles about the hurricane because the new hurricane would not be associated with the new name "Irma" until the next static update of the recommender system.

SUMMARY

A real-time recommender method of a RTRM system includes a processor receiving and processing the streaming data including data related to a new item and a user request from each of a first user and a second user, extracting features from the data, applying the extracted features to a feature detect mechanism, testing each applied feature using one or more feature detect algorithms to accept or reject each applied feature, installing each accepted feature to one or more recommender algorithm models, processing the user request and identifying the user, determining sufficient information already exists in the RTRM system for the first user, and determining insufficient information already exists in the RTRM system for the second user. For the first user, the method includes employing the recommender algorithm models, using the information already existing in the RTRM system to generate and provide one or more recommendations to the first user. For the second user, the method includes executing a cold start process employing at least one of the recommender algorithm models, using information included in the user request of the second user to generate and provide one or more recommendations to the second user.

A method for making recommendations in real-time includes a processor receiving streaming data from a plurality of streaming data sources, the streaming data having one or more data records, each data record having data and meta data; the processor, in real-time, applying one or more tokenizer objects to a received data record, including identifying one or more data elements in data of a data record and in meta data of the data record and extracting and buffering the one or more data elements. The method further includes the processor, in real-time, applying each of the one or more buffered data elements to a feature detect tree, the feature detect tree comprising a root node and one or more subsequent branch nodes, a set of the one or more subsequent branch nodes comprising a path culminating in a leaf node, the method by applying a data element to the root node of the feature detect tree and testing the data element to reject or select the data element, applying a prior-selected data element to one or more subsequent branch nodes of one or more paths of the feature detect tree, and conducting at each of the one or more subsequent branch nodes, a test to reject or select the prior-selected data element, and stopping, for a selected path, the applying and testing after the prior-selected data element reaches a path's leaf node. The method still further includes the processor, installing, in real-time, each data element reaching the path's leaf node, as a feature, into one or more recommender algorithm models.

A real-time recommender modeling method includes a computer executing instructions to generate a plurality of feature detection algorithms; the computer encapsulating one or more of the plurality of feature detection algorithms into a feature detection object using a Strategy/Composite design pattern to generate a plurality of Strategy/Composite feature detection objects; the computer generating a feature detect tree, the feature detect tree comprising a root node, a plurality of branch nodes, and a plurality of leaf nodes, the feature detect tree defined by a plurality of unique feature traversal paths beginning at the root node and terminating at one of the leaf nodes; at each of the root node and the plurality of branch nodes, the computer installing one or more of the Strategy/Composite feature detect objects; the computer executing instructions to generate a plurality of feature install algorithms; the computer encapsulating each of the feature install algorithms in a feature installation object; the computer linking each of the leaf nodes to one of the feature installation objects; and the computer linking each of the feature installation objects to one of a plurality of recommender algorithm models.

A non-transitory, computer-readable storage medium has encoded thereon machine instructions to implement a real-time recommender method. A processor executes the machine instruction to receive streaming data from a plurality of streaming data sources, the streaming data comprising one or more data records, each data record comprising data and meta data; in real-time, apply one or more tokenizer objects to a received data record. The processor further executes the machine instructions to identify one or more data elements in data of a data record and in meta data of the data record, and extract and buffer the one or more data elements; in real-time, and apply each of the one or more buffered data elements to a feature detect tree, the feature detect tree comprising a root node and one or more subsequent branch nodes, a set of the one or more subsequent branch nodes comprising a path culminating in a leaf node. The processor further executes the machine instructions to apply a data element to the root node of the feature detect tree and testing the data element to reject or select the data element, apply a prior-selected data element to one or more subsequent branch nodes of one or more paths of the feature detect tree, and conduct at each of the one or more subsequent branch nodes, a test to reject or select the prior-selected data element, and stop, for a selected path, the applying and testing after the prior-selected data element reaches a path's leaf node. The processor further executes the machine instructions to install, in real-time, each data element reaching the path's leaf node, as a feature, into one or more recommender algorithm models.

DESCRIPTION OF THE DRAWINGS

The detailed description refers to the following figures in which like numerals refer to like objects, and in which:

FIGS. 3A and 3B illustrate the example RTRM system;

FIGS. 7A-7G illustrate example objects that may be used with the RTRM system of FIGS. 3A and 3B;

FIGS. 8A-8H illustrate selected elements of an example data feed that may be processed by the RTRM system of FIGS. 3A and 3B.

DETAILED DESCRIPTION

Figure 1A:
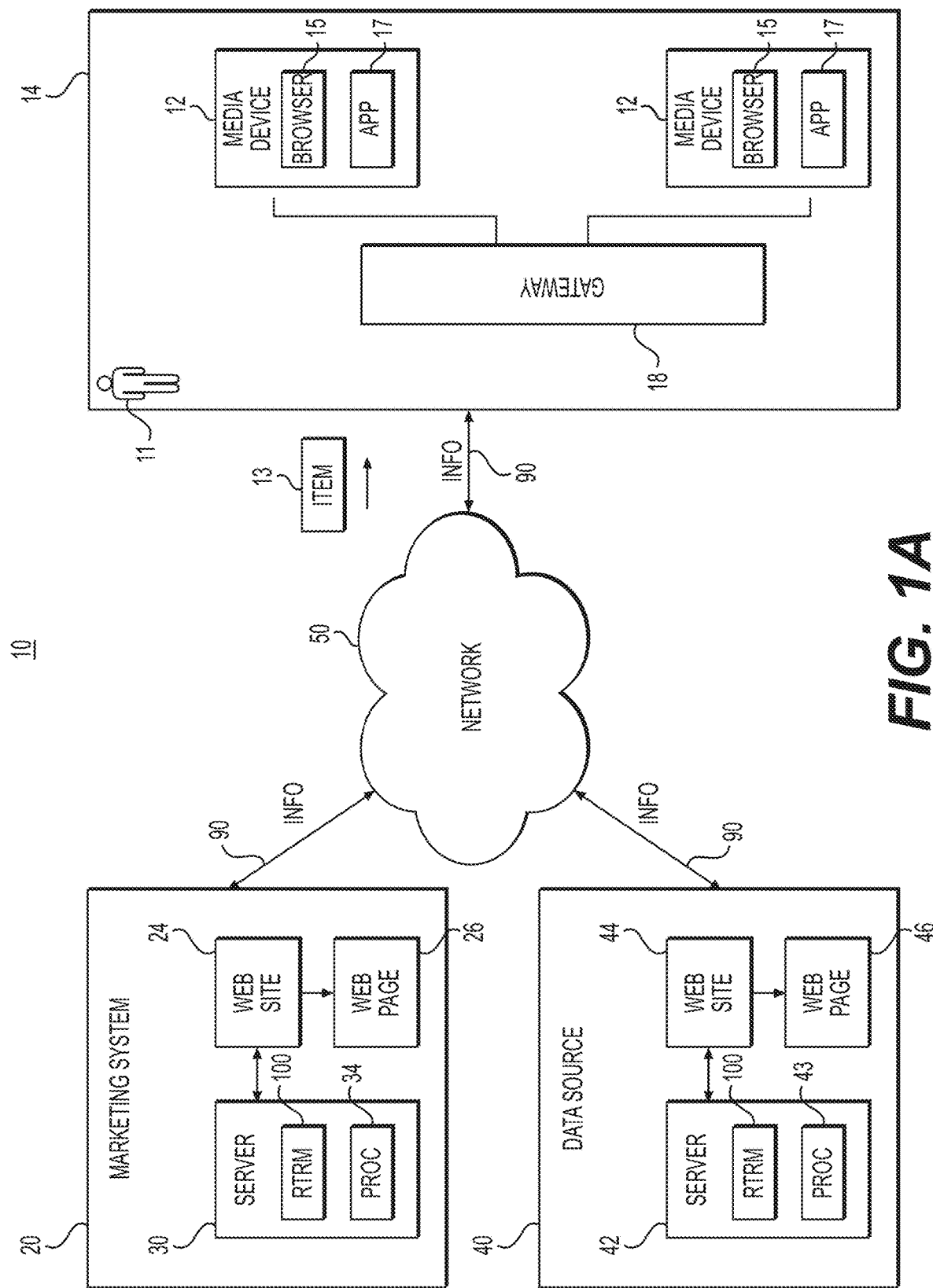
FIGS. 1A and 1B illustrate an environment in which an example real time recommender modeling (RTRM) system may operate.

From the perspective of individual consumers (i.e., users), recommender systems may help users find and select products or services most suitable to their tastes and needs. From the perspective of a business or an organization, recommender systems may increase sales or supply of goods and services (i.e., items) to users. The enhanced sales or supply of goods and services may result from predictions the recommender system makes about the users. The predictions often are based on information (or attributes) a recommender system holds about the user, with the recommender system employing this user information to compare to attributes of other, similar users. Other recommender systems, in order to make a prediction, may compare an item's features to features of items previously viewed by or provided to a user. The item's features may be derived from a data record comprising, defining, or describing the item. For example, an extreme weather report (an item) may be defined by a multimedia data record that includes text, video, still images and audio. A data record may include a number of "chunks." For example, a video file in an extreme weather report may be a "chunk."

A feature, as used herein, is an individual measurable or definable property or element of an item, such as a Twitter interest, a rating, and a like/dislike. Other features include names and phrases, such as the name of an actor in a movie. Traditional feature selection methods assume that all features are statically pre-computed. Static pre-computation may work for items whose features do not change often; but not all features may be present in advance of reception of a data stream containing the items, and some item features may change. Furthermore, some highly dynamic domains, like news or social media domains, create new time sensitive items at a fast rate, such as unfolding news events whose features become stale with time. For example, a request from a user to a recommender system for news about a new hurricane, using a newly applied tag, name, or keyword such as "Irma," will not return relevant articles about the hurricane because the new hurricane may not be associated with the new name "Irma" until the next static update of the recommender system. Some current recommender systems employ an ensemble of recommender methods. For example, some recommender systems use collaborative filtering, which predicts user preferences based on users with similar preferences. But a new user may have a "cold start" problem because the recommender system initially has no user data to compare with that of others users. To address the cold start problem, some recommender systems employ context filtering or other methods to initially populate data, such as movie genres a user selected as interesting at initial signup, for example. However, keywords alone may not be sufficient to judge the quality or relevance of an item, including whether the item is up-to-date or relevant to a specific user, or is a duplicate of or similar to other items, or to determine item's aesthetics, for example.

Collaborative filtering methods, in contrast to content filtering methods, filter information by using the observed behavior of other users. For example, some collaborative filtering methods are based on the idea that users who agreed in their evaluation of certain items in the past are likely to agree again in the future. A user who wants to see a movie, for example, might ask for recommendations from friends. The recommendations of some friends who have similar interests are trusted more than recommendations from others. This information is employed in making a decision on which movie to see. Some collaborative filtering systems apply a neighborhood-based method in which a number of users are selected based on their similarity to the active user (i.e., the user for whom a prediction or recommendation is to be made). A prediction for the active user may be made by calculating a weighted average of the ratings of the selected users. Instead of just relying on the most similar person, a prediction may be based on the weighted average of the recommendations of several users. The weight given to a user's ratings is determined by the correlation between that user and the active user. Many collaborative filtering systems have to process a large number of users. Making a prediction based on the ratings of thousands of users may degrade run-time performance. Therefore, when the number of users reaches a certain amount, a selection of the best neighbors may be made. Two techniques, correlation-thresholding and best-n-neighbor, may be used to determine which neighbors to select. The first technique selects only those neighbors whose correlation is greater than a given threshold. The second technique selects the best n neighbors with the highest correlation. Although processing a large number of ratings may degrade performance, for most collaborative filtering systems, having too few ratings to process may be a more serious problem. This "sparsity" problem occurs when the number of items become very large, thereby reducing the number of items users have rated to a small percentage. In such a situation, it is likely that two users have few rated items in common, making the correlation coefficient less reliable. Several techniques have been used to overcome this sparsity problem. One technique inverts the neighborhood-based method; instead of measuring similarities between and among users, the technique measures correlations between items. For example, the ratings of the movies "Reservoir Dogs" and "Pulp Fiction" may have a perfect correlation. Based on this correlation, the neighborhood-based method might predict that a user who liked "Reservoir Dogs" also might like "Pulp Fiction."

Adding to problems encountered using current, static recommender systems, the volume and availability of streaming, time-series data is increasing, largely driven by the rise of connected real-time streaming data sources. Theoretically, streaming data analytics may be used to model each data stream in an unsupervised fashion and detect unusual, anomalous behaviors, or features, in real-time. However, in practice, such feature detection may be difficult to execute reliably because application constraints often require systems to process data in batches, and streaming data inherently exhibits concept drift, favoring algorithms that learn continuously. Furthermore, the large number of independent data streams in practice may require that feature detectors be fully automated. Because of these and other challenges, current recommender systems use batch updating.

To improve the performance possible from current, static recommender systems, disclosed herein is a recommender system that evolves in real-time as the recommender system ingests new content. The recommender system may dynamically populate/update a recommender algorithm model with features and data as needed. The herein disclosed recommender system employs algorithms that recognize new features and properly adjust the recommender algorithm models with the new features. More specifically, disclosed herein is real time recommender modeling (RTRM) system that provides an architecture for building, testing, running, and dynamically updating (i.e., in real-time, namely within milliseconds of receipt of new feature data or new user attributes) recommender systems and for applying updated recommender models to make corresponding updated, and relevant, item recommendations. The RTRM system allows an operator to create, update and run multiple recommender systems in either an internal or external (e.g., commercial) environment (see FIG. 1A for an example external, commercial environment). The RTRM system encapsulates different feature detect algorithms into feature detection objects and encapsulates feature install algorithms into multi-threaded feature installation objects. By thus separating feature install logic from feature detect logic, the feature detection objects and the feature installation objects are easy to reuse, modify, and distribute. The RTRM system enables building and chaining many feature detection objects to effectively and easily update dynamic recommender algorithm models. In an aspect, the RTRM system reads and extracts item feature data from one or more "big data" data streams. In an embodiment, item feature data are installed in and used by the dynamic recommender algorithm models only after the feature "successfully" traverses an ordered collection or structure of feature detection objects. A feature that successfully traverses the structure then may be installed into one or more of an ensemble of recommender algorithm models by separate threads of feature installation objects.

Thus, in an aspect, the RTRM system provides encapsulation of feature detect algorithms using feature detection objects that contain business logic to filter features. The RTRM system addresses several limitations inherent in content-based and collaborative-based filtering methods. The RTRM system allows features to be assigned to items either automatically or manually. When features are assigned automatically, the RTRM system may invoke a method that extracts features from data related to the items. The RTRM system then represents the features such that both user attributes and item features may be compared meaningfully. The RTRM system further may invoke a learning algorithm that learns the user attributes (and that may create a corresponding user profile) based on extracted item features, and that makes recommendations or predictions based on user attributes and item features.

To create a user profile, and to determine which items to recommend to a user, the RTRM system may depend in part on information related to the user. In some situations, users agree to employment of their information by the RTRM system, and the information may be provided by the users voluntarily. For example, a user may register with a service and may provide information such as a password and user identification (ID). In situations in which the RTRM systems disclosed herein collect personal information about the user, or may make use of personal information, the users may be provided with an opportunity to control whether programs of the RTRM systems collect user information (e.g., information about a user's social network, social actions or activities, profession, preferences, or current location), or to control whether and/or how to receive recommendations that may be more relevant or of interest to the user. In addition, certain information may be treated in one or more ways before the RTRM systems store or employ the information, so that personally identifiable aspects of the information are removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may control what information the RTRM systems collect about the user, how that information is collected, and how the collected information is used.

In an embodiment, the RTRM system provides inclusion of a collection of feature detection objects into a feature detect tree structure that describes the desired filtering of features. In an embodiment, the feature detection objects implement Strategy and Composite design patterns (and/or other design patterns). The RTRM system also provides encapsulation of multi-threaded feature install algorithms into feature installation objects that contain the logic to dynamically install features into the recommender algorithm models. The feature installation objects also may implement Strategy and Composite design patterns, and/or other design patterns. Examples of Strategy and Composite design pattern implementation are disclosed in more detail herein.

The RTRM system may be used with collaborative recommender algorithm models, content recommender algorithm models, and combinations of the two models. While the RTRM system is described with a focus on collaborative and content-based methods, the RTRM system also may be used with alternative recommender algorithm models including contextual, direct likes, inferred likes, social, demographic, knowledge-based, collaborative filtering of products, previously viewed items, and popular interests/products.

FIG. 1A illustrates an environment in which an example RTRM system may operate. In FIG. 1A, example environment 10 includes multiple users 11 (for clarity, only one user 11 is shown) who operate media devices 12 to access marketing systems 20 that provide information, goods, and services (i.e., items 13) to the users 11. The marketing systems 20 (for clarity only one is shown) each include a server system 30 (discussed in more detail with respect to FIG. 2) that communicates with the media devices 12. The server systems 30 each may include an RTRM system 100 and processors 34 that execute the RTRM system 100. Also shown in FIG. 1A are streaming data sources 40 (for clarity, only one is shown). The streaming data sources 40 may include server systems 42 to provide data to the marketing systems 20 and to the users 11 directly or through the marketing systems 20. In an embodiment, the server systems 42 also may include an RTRM system 100 and processors 43 that execute the RTRM system 100. In an aspect, the media devices 12, the server systems 30, and the server systems 42 communicate with each other through network 50 to provide streaming data 90 and certain items 13.

Marketing systems 20 may communicate with other entities through Web site 24 and corresponding Web pages 26, by email, and by other means. The streaming data sources 40 may communicate with other entities through Web site 44 and corresponding Web pages 46, by email, and by other means. A user 11 may operate the media devices 12 to connect with the server systems 30 and 42 from viewing location 14. The viewing location 14 may be a fixed location such as the residence or a business of the user 11, or a retail store, for example; the viewing location 14 also may be a mobile location, such as in an automobile or a train, for example. In an embodiment, the user 11 operates media devices 12 to access, through gateway router 18 or another gateway device, resources such as the Web sites 24 and 44. The media devices 12 may be fixed or mobile. For example, a media device 12 may be an Internet connected "smart" television (iTV); a "basic" or "smart" television connected to a set top box (STB) or other Internet-enabled device; a Blu-ray™ player; a game box; or a radio, for example. A media device 12 also may be a tablet, a smartphone, a laptop computer, or a desk top computer, for example. The media devices 12 may include browsers, such as browser 15. The browser 15 may be a software application for retrieving, presenting, and traversing resources such as at the Web sites 24 and 44. A resource may be identified by a Uniform Resource Locator (URL) and may be a Web page that includes text, image, video, or other content. The URL may allow the browser 15 to connect to Web sites 24 and 44. Hyperlinks present in resources enable the user 11 to navigate the browser 15 to related resources. The user 11 may operate the browser 15 to search for Web sites related to specific topics or to search for a specific Web site by URL. The media devices 12 also may include applications 17. The user 11 may cause the media devices 12 to execute an application 17. The application 17 may involve use of means to connect to items 13 provided through the marketing systems 20 and the streaming data sources 40.

The user 11 may operate the media devices 12 to access the marketing system 20, including Web site 24 and the data source 40, including Web site 44. While accessing the Web sites 24 and 44, for example, the user 11 may submit search queries or user requests 97 (see FIG. 1B) and consume corresponding search results, may purchase or acquire (i.e., consume) products or services (i.e., items 13), may read or listen to (i.e., consume) video and/or audio files provided through the Web sites 24 and 44, may post recommendations or comments, refer items 13 to other users, or otherwise consume items 13 provided by the marketing systems 20 and data sources 40.

When a user 11 accesses items 13 provided by, for example, the marketing system 20, or otherwise logs on to Web site 24, a session identification (ID), at least, may be created by components of the marketing system 20 to identify the user 11. The Web site 24 may store cookies, or similar information, in the user's browser 15, which the processor 34 may employ subsequently, to identify further accesses by the user 11 to the marketing system 20. Thus, interaction with the marketing system 20 may establish at some identifying information for the user 11 that is accessible by the processor 34. Subsequent purchases, Web site browsing, or another item consumption by the user 11 may be observed and stored by the processor 34 and may be tied to the user 11. In addition, the user 11 may register with the marketing system 20, including establishing a user ID and password. Further, the user 11 may voluntarily provide personal information to the marketing system. The processor 34 may use any or all of this information and data to create and enhance a user profile 107A (see FIG. 3B).

The network 50 may be any communications network that allows the transmission of signals, media, messages, voice, and data among the entities shown in FIG. 1A, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be all or a portion of an enterprise or secured network. In an example, the network 50 may be a virtual private network (VPN) between the streaming data sources 40 and a media device 12 operated by the user 11 across a wireline or a wireless link. While illustrated as a single or continuous network, the network 50 may be divided logically into various sub-nets or virtual networks, so long as at least a portion of the network 50 may facilitate communications among the entities of FIG. 1A.

In an aspect, the users 11, marketing systems 20 and streaming data sources 40 all may be independent of each other. In another aspect, the streaming data sources 40, for example, may belong to an organization, such as a business or government agency, and the user 11 may work for, or otherwise be associated with the organization. In addition, the marketing systems 20 may themselves be streaming data sources.

In an aspect, the marketing systems 20 may ingest some or all streaming data from one or more of the streaming data sources 40 and may broadcast, re-broadcast, or otherwise provide the ingested streaming data from the streaming data sources 40 for consumption by the user 11.

Figure 1B:
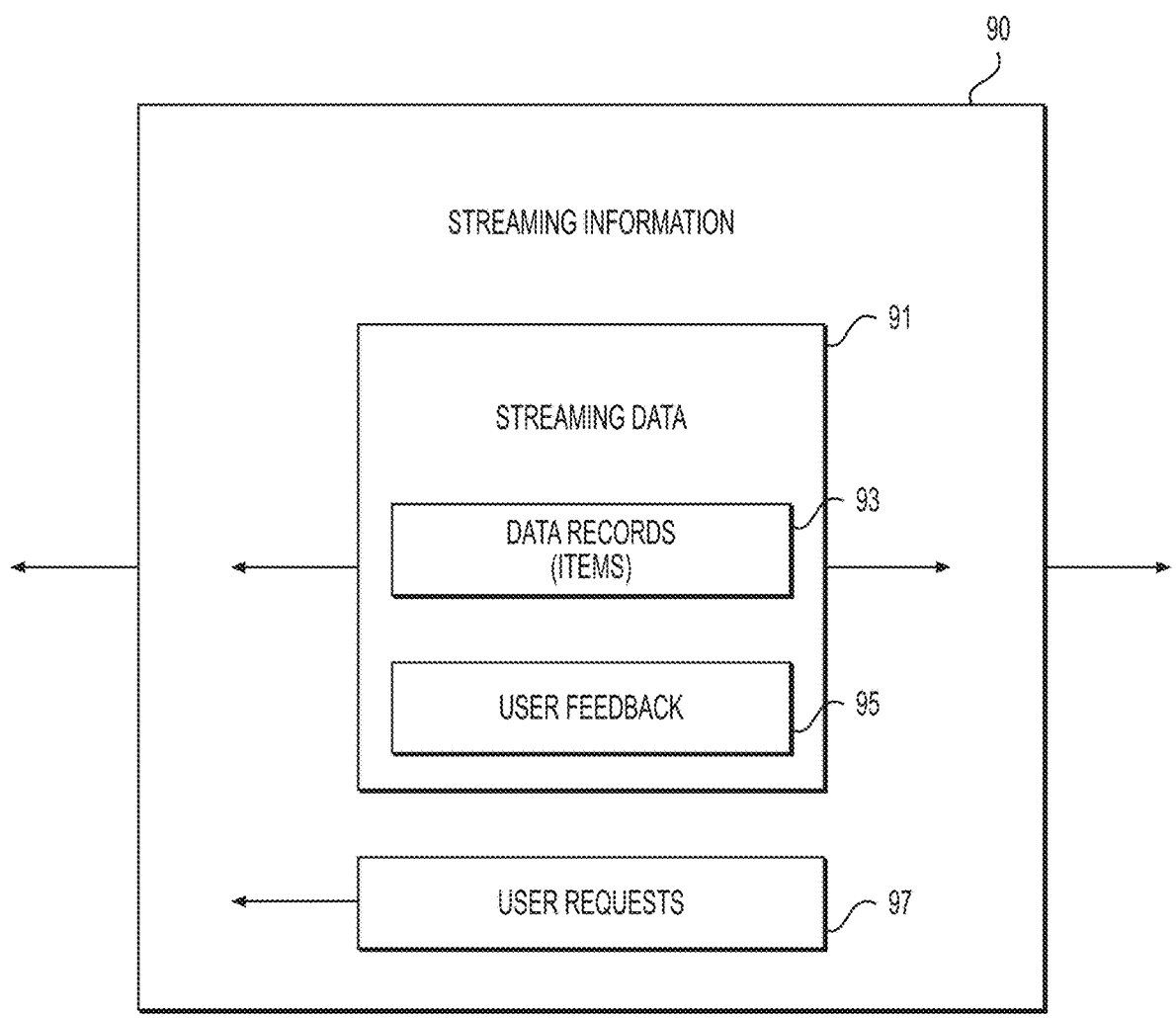

FIG. 1B illustrates an example of streaming data that may be transmitted and received by the entities of FIG. 1A. In FIG. 1B, streaming data 90 includes streaming data 91 related to items 13. The streaming data 91 related to items 13 may include streaming data records 93 (e.g., an item 13 itself, such as a newly broadcast emergency weather report, or a Web page 26 for an item 13, such as an Indian cookbook, being sold by marketing system 20) and user feedback 95 related to items 13 consumed by the users 11. The user feedback 95 may be explicit, such as when a user 11 provides a star rating and/or writes a review for a purchased item 13, or implicit, such as when a user 11 views all or a sufficient part of the extreme weather report (including any embedded advertisements). The streaming data 90 also includes user requests 97, such as a user-initiated search of Web site 24 for an Indian cookbook.

Figure 2:
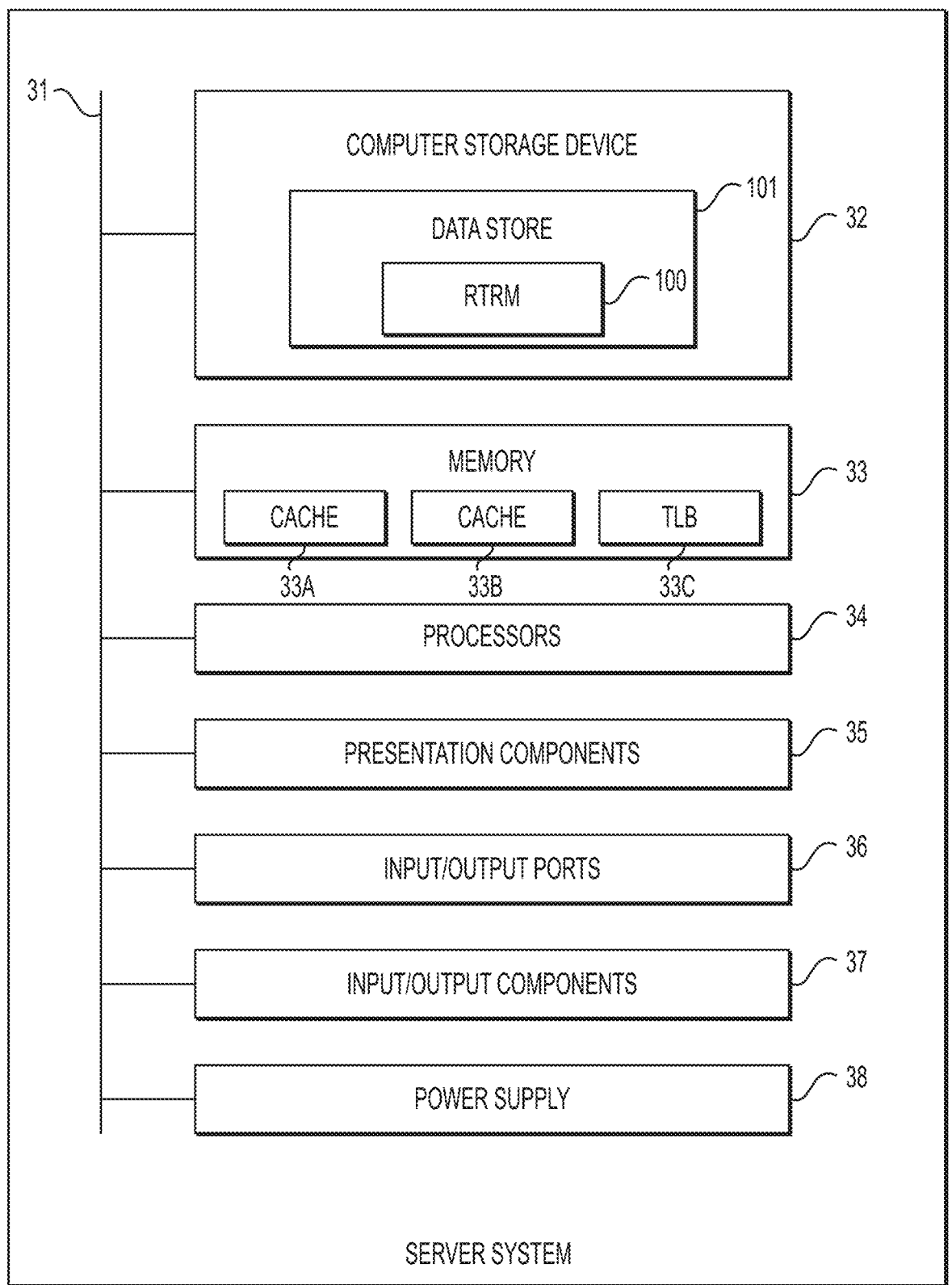
FIG. 2 illustrates an example server system on which the RTRM system may be instantiated.

FIG. 2 illustrates an example server system 30. In FIG. 2, server system 30 includes bus 31 that directly or indirectly couples storage device 32, memory 33, processors 34, presentation components 35, input/output (I/O) ports 36, input/output components 37, and power supply 38. Bus 31 represents what may be one or more busses (such as an address bus, data bus, or combination thereof). Although the various blocks of FIG. 2 are shown with lines for the sake of clarity, in reality, delineating various components is not so clear; for example, one may consider a presentation component such as a display device to be an I/O component. Also, processors 34 have memory. Thus, the diagram of FIG. 2 is merely illustrative of a server system that may be used in connection with one or more embodiments of the herein disclosed inventions. Distinction is not made between such categories as "workstation," "server," "laptop," "hand-held device," etc., as all are contemplated within the scope of FIG. 2 and reference to a "server system." Storage device 32 may include a variety of non-transitory, computer-readable storage media. Such computer-readable storage media may be any available media that can be accessed by the processors 34. For example, the storage device 32 may include RTRM system 100 and its associated data store 101. Memory 33 includes computer-readable storage media in the form of volatile and/or nonvolatile memory. The memory 33 includes instruction cache 33A, data cache 33B, and translation lookaside buffer 33C. The caches 33A and 33B may include several cache levels. Alternately, these memory components may be resident on the processors 34. Operation of these memory components is well known to those skilled in the art. As disclosed herein, the RTRM system 100 may leverage these memory components to speed model updates and item recommendations. The memory 33 may be removable, non-removable, or a combination thereof. Example memory devices include solid-state memory, hard drives, and optical-disc drives. The processors 34 read data from various entities such as storage device 32, memory 33 or I/O components 37. Presentation components 35 present data indications to a user 11 or to other serving systems. Example presentation components 35 include a display device, speaker, or printing component. I/O ports 36 allow server system 30 to be logically coupled to other server systems.

In an aspect, one or more of the processors 34 load aspects of the RTRM system 100 from computer storage device 32 into memory 33 and the processors 34 then execute the machine instructions that constitute the RTRM system 100. The processors 34 also access data to execute the RTRM system 100 machine instructions by reading and writing data from memory 33 or storage device 32.

FIG. 3A illustrates an example RTRM system. In FIG. 3A, RTRM system 100 includes stream server component 110, feature install component 150, recommender algorithm model component 170, and recommender component 180. Finally, the RTRM system 100 includes an admin/operator page component (e.g., interface 190) and non-transitory, computer-readable data store 101, on which the above components as well as data may be stored.

Figure 3B:
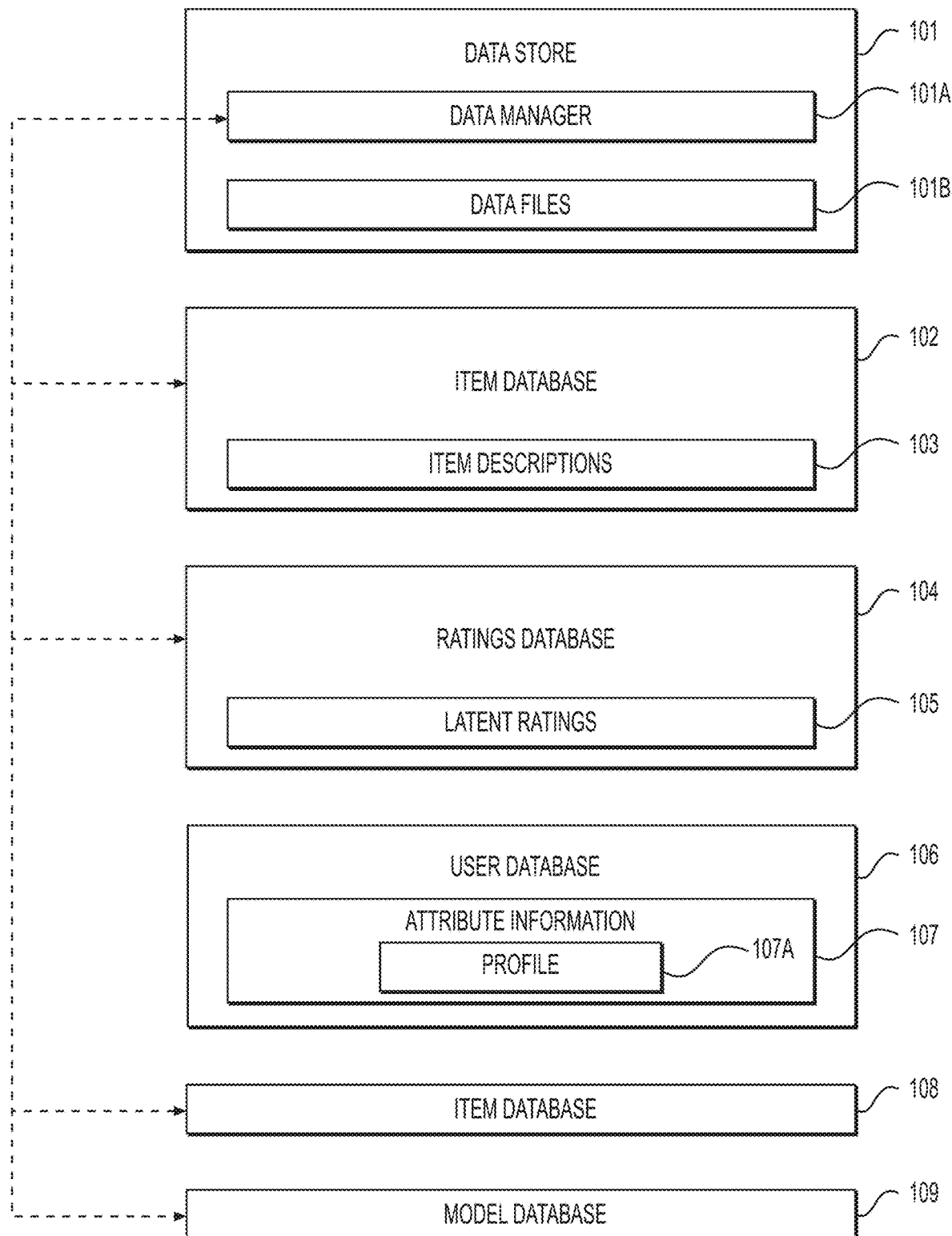

FIG. 3B illustrates an example data store 101, which includes data manager 101A and data files 101B. The data manager 101A may cooperate with database managers of the host server system 30 to generate one or more of the following data structures: an item database 102, a ratings database 104, a user database 106, a recommended item database 108, and a model database 109. The item database 102 may include item descriptions 103 for items 13. The item descriptions 103 may include item features. The ratings database 104 may include latent ratings 105 for certain items 13. The user database 106 may include user attribute information 107 for certain users 11. The recommended item database 108 may include items 13 recommended for consumption by specific users 11. The model database 109 may store recommender algorithm models employed by the RTRM system 100. These databases and their contents are disclosed in more detail herein.

Returning to FIG. 3A, the stream server component 110 includes data input and processing mechanism 120 and feature detect mechanism 130. The data input and processing mechanism 120 functions to test incoming data streams (e.g., streaming data 91) to ensure the data streams meet data requirements of the RTRM system 100. The data input and processing mechanism 120 may combine both batch and streaming data processing. Data first may be processed by a streaming data platform to extract real-time insights, and then stored in a memory component, including the data cache 33B or persisted into data storage device 32 (see FIG. 2) where the stored data may be transformed and loaded for a variety of batch processing use cases. In general, batch processing may be used to compute arbitrary queries over different data sets. Batch processing results may enable deep analysis of big data sets. The data input and processing mechanism 120 may use, for example, a MapReduce-based platform to support batch data processing. The data input and processing mechanism 120 also may include streaming data processing to ingest a sequence of data, and incrementally update metrics, reports, and summary statistics in response to the arriving streaming data 91. Processing steaming data 91 provides for real-time response functions. Streaming data 91 may be generated continuously by thousands of data sources (e.g., the data sources 40 of FIG. 1A), which may send in data records simultaneously, but in small size records (e.g., on the order of Kilobytes). Streaming data 91 may include data such as log files generated by users 11 operating mobile or Web applications, making ecommerce purchases, in-game player activity, information from social networks, financial trading floors, or geospatial services, and telemetry from connected devices or instrumentation in data centers. The mechanism 120 may process streaming data 91 sequentially and incrementally on a record-by-record basis or over sliding time windows. Insights derived from analyzing such data may give businesses and organizations a view into many aspects of their internal operations, as well as user activity such as service usage (for metering/billing), server activity, Web site clicks, and geolocation of media devices 12, users 11, and physical goods. For example, businesses may follow changes in public sentiment of their brands and products by continuously analyzing social media streams, and respond in real-time (i.e., within milliseconds). Streaming data processing may be beneficial in scenarios where new, dynamic data are generated on a continual basis. Streaming data processing may apply to many data sources, particularly to big data sources. The mechanism 120 may operate to extract discrete elements (words, images, video, and audio, as well as meta data) from a data record. The extraction operation may be simplified when the data record contains only text (i.e., is a text record). However, the data records may arrive at the mechanism 120 in chunks, such as one line of text at a time or a paragraph at a time, for example. The mechanism 120 further operates to track each chunk of a larger data record. The mechanism 120 may perform streaming data processing using storage layer 122 and processing layer 124. The storage layer 122 supports data record ordering and consistency to enable fast, inexpensive, and replayable reads and writes of large streams of data. The processing layer 124 consumes data from the storage layer 122, runs computations on that data, and then may notify the storage layer 122 to delete the data. The mechanism 120 also may receive user feedback 95, which may be processed and stored in the data store 101, and user requests 97, which may be processed and then sent to the recommender component 180 (see FIG. 1B).

Because the incoming streaming data 91 may have disparate types of data, the feature detect mechanism 130 may receive pre-processed feature data to ensure the feature data has certain qualities and characteristics before the features are applied to the feature detect mechanism 130.

More specifically, the RTRM system 100, and particularly the data input and processing mechanism 120, may use a set of classes called readers to read text from ingested streaming data records. Readers also may read from disk files or other media. Other readers may read meta data associated with a specific data record. Readers contain logic that translates from external encodings into internal code used by the RTRM system 100. When a text data record is read into the RTRM system 100, the text may be analyzed and pre-processed to segregate the text by, for example, identifying words, phrases, and numbers for further analysis and ultimately extraction of desired data (i.e., elements that may become features). The thus-identified elements may be known keywords or key phrases, or may be words or phrases that have certain pre-defined characteristics or qualities such as a City-State pair, for example. In some instances, the pre-processing may involve processing individual characters in a text string. However, breaking the text string into portions larger than a character may be preferable. For example, the text string might contain proper nouns, or might contain comma-separated numbers. For this purpose, the RTRM system 100 may employ a tokenizer object to segregate or parse the text string into individual elements, sometimes called tokens. A stream tokenizer class takes an input data stream and parses it into tokens, allowing the tokens to be read one at a time. The parsing process may be controlled by a table and a number of flags that can be set to various states. The stream tokenizer can recognize identifiers, numbers, quoted strings, and various comment styles. A tokenizer object may specify delimitators, that is, how the tokens are to be separated. For example, StringTokenizer features=new StringTokenizer(buffer, ",;"); defines a string tokenizer named "features" that uses either commas or semicolons to divide tokens. This assumes that the text string named "buffer" has a semicolon or comma-delimited structure. If the tokenizer object does not specify delimiters, then ordinary white space characters (space, tab, and new-line) may be used as defaults. The tokenizer object then is able to extract the tokens from the text string.

In an embodiment, in lieu of, or in addition to use of tokenizer objects, the RTRM system 100, and more particularly the data input and processing mechanism 120, may use natural language processors (NLPs) to identify potential features in a data record.

Returning to use of tokenizer objects, consider a weather forecast streaming data source (e.g., streaming data source 40 of FIG. 1A) that provides weather reports on Web pages 46, including reports of tropical storm and hurricane activity in the Atlantic. An example may be the National Hurricane Center, which operates a Web site 44 with Web pages 46. Another streaming data source may be marketing system 20, which markets news reports and repackages information gleaned from the Web pages 46 of the National Hurricane Center. See FIGS. 8A-8H, for example. Note that the system 20 is a marketing system at least in the sense that the system 20 derives revenue from advertisements placed on its Web pages 26 along with new or repackaged news reports, including extreme weather reports. Processes for deriving revenue from Web page advertisements are well known to those skilled in the art and need not be described herein.

Since 1953, Atlantic tropical storms had been named from lists originated by the National Hurricane Center. The lists now are maintained and updated by an international committee of the World Meteorological Organization (WMO). The WMO currently provides six lists of 21 first names, and the lists are used in rotation. Thus, the lists are recycled every six years. Under some circumstances, names are deleted or added to the lists. The RTRM system 100 may be able to determine when a new tropical storm or hurricane develops based solely on reading a new first name (i.e., an element, and ultimately a feature, as used in the RTRM system 100) in a streaming weather report and comparing that name to the WMO-provided name lists. Assuming the weather report is in the form of one or more text (data) records consisting of words separated (delimited) by white spaces or punctuation marks, still images, and video clips, the RTRM 100 may extract and save words, numbers, images, videos, and other elements that conform to a new tropical storm or hurricane while factoring out superfluous text such as articles, prepositions, conjunctions, and pronouns, for example. Furthermore, the weather report may include a current category number of the storm, current maximum sustained wind speed and current latitude and longitude (i.e., current geolocation). A computer program (tokenizer object) designed to extract each of these elements from the weather report may have the same structure, so that a single tokenizer object could be written to address one element, and then may be modified to address the other elements. However, the tokenizer object also may be written in such a way that modifications are not needed. To do this, the RTRM system 100 may factor out variable portions of the tokenizer object, leaving the tokenizer object with just its common portions. The variable portions of the tokenizer object may be referred to as a Strategy design pattern. The variable portions involve examining a word or other element from the text file or other elements from a data record and determining if the word or element has a certain characteristic or value. Thus, a Strategy design pattern may be used to factor out what might be variable in a set of problems and build an interface for the variable. Next, a solution to each problem is written in terms of the interface. The interface is used as the parameter type of one or more methods in the class that solves the problem. A Strategy might consist of one or more methods. These methods are called as appropriate to tailor the solution to the specific problem. When the general solution is to be reused in a new situation or problem, a new Strategy is written for the new situation.

This Strategy design pattern may be implemented using an interface such as interface 710 shown in FIG. 7A. Individual Strategy design patterns then may be implemented using a variable tokenizer object, such as tokenizer object 720 shown in FIG. 7B.

Next, the RTRM system 100 writes the part of the tokenizer object to use a Strategy object to carry out the task of reading a possible feature. In this example, the tokenizer object 730 is a method that processes a named file such as shown in FIG. 7C. In an embodiment, this method reads through the entire data record a line at a time or chunk at a time and then processes each line or chunk a word at a time. For each word, the method applies the Strategy design pattern and saves the word if the Strategy returns true.

While a Strategy design pattern allows factoring out the parts of a program that change with changes in a set of problems, some situations may dictate use of many Strategies. In such a situation, an objective may be to find all elements in a data record that satisfy all criteria. In other words, apply all Strategies and take the intersection of the results by composing all Strategy design patterns with a Composite design pattern. A Composite design pattern is an object that implements an interface and provides a container that contains Strategies that implement the same interface. Then, when the Composite object gets a message, the Composite object passes the message on to the other objects in the container. An example Strategy/Composite object may be used to compose strategies using a logical AND. The example Strategy/Composite object may implement a CheckStrategy and may contain CheckStrategies. See the example of FIG. 7D. The Strategy/Composite object 740 returns false if any of the Strategy objects it contains returns false for the same element. Otherwise, the Strategy/Composite object 740 returns true.

The RTRM system 100 thus may provide a new object, AndStrategyComposite and then may add other Strategies to the new object. The AndStrategyComposite object 750 then may be used as a Strategy itself; see FIG. 7E. The AndStrategyComposite object 750 is a container that implements an interface and that contains objects that also implement the same interface. When the AndStrategyComposite object 750 gets a message defined in the interface, it passes that message on to those objects in the AndStrategyComposite object container.

Consider a more concrete example of application of the RTRM 100 to an extreme weather report 800, example chunks of which are illustrated in FIGS. 8A-8H. The extreme weather report 800 is an actual extreme weather report (for Hurricane Irma in August-September 2017) posted on a Web page from a news broadcaster (CNN). The actual extreme weather report includes chunks or elements previously provided by other data sources such as the National Hurricane Center. The extreme weather report 800 provides text, still images, video clips, and hypertext links to other Web pages, for example. The data input and processing mechanism 120 may process the extreme weather report 800 to define and segregate distinct and useful elements and provide those distinct and useful elements to the feature detect mechanism 130. In an embodiment, the RTRM system 100 may pre-process the entire data record (e.g., the extreme weather report 800) as a unitary data record. In another embodiment, the RTRM system 100 may pre-process the data record one chunk at a time; i.e., process each chunk as an individual data record. In either embodiment, the mechanism 120 may provide a pre-processing operation so as to limit the processing load on the feature detect mechanism 130. For example, the mechanism 120 may identify or eliminate articles, pronouns, conjunctions, prepositions, and similar elements from the incoming data record. To perform the pre-processing operation, the mechanism 120 may employ a number of reader objects and tokenizer objects as disclosed herein. Moreover, at least the tokenizer objects may employ a design pattern, such as a Strategy design pattern and a Composite design pattern. Finally, the chunks illustrated in FIGS. 8A-8H may not conform to actual data records arriving at the RTRM system 100, and thus FIGS. 8A-8H are provided for illustration purposes only. Furthermore, the chunks illustrated in FIGS. 8A-8H do not include all the chunks and elements of the actual extreme weather report.

FIG. 8A illustrates a title (or chunk) 810 of extreme weather report 800, which is seen to include a new hurricane name, Hurricane Irma (in reality, Tropical Storm Irma was named before Sep. 2, 2017, and had intensified into Hurricane Irma prior to this date). The title 810 also includes a byline 813 for the weather report's author, including his affiliation to the marketing system 20, and the date the extreme weather report was posted to a web page. Note that the element, or feature "Hurricane Irma" 811A, is modified by the adjective "powerful" 811B. In the context of extreme weather reports, such an adjective may itself constitute a feature, or a portion of a feature (e.g., "Powerful Hurricane Irma," **811*811A plus 811B)). Other data elements include "weather data," 812 and the author's byline 813**.

FIGS. 8B and 8C illustrate, respectively, chunks 820 and 830 of the extreme weather report 800, which include text strings with elements (the outlined text) that could be tokenized or extracted, including "rapidly intensifying," "open Atlantic," "major threat," "Caribbean," "next week," and "rapid intensification," for example.

FIG. 8D illustrates chunk 840, which, among other information, refers to outlined "Cape Verde hurricane," and provides examples of significant hurricanes that formed near the Cape Verde Islands.

FIG. 8E illustrates chunk 850, which refers to the current strength of Hurricane Irma, namely Category 4 (both outlined).

FIG. 8F illustrates chunk 860, which is a static image showing the current location of Hurricane Irma. While chunk 860 does not explicitly state the geographic location of Hurricane Irma, it does include lines of latitude and longitude, from which the RTRM system 100 may derive a rough geographic location.

Figure 8G:
Figure 8G:

FIG. 8G illustrates chunk 870, which is a video clip of Hurricane Irma with additional text. Chunk 870 originated with the National Hurricane Center. Chunk 870 also includes text and an outlined hypertext link.

Figure 8H:
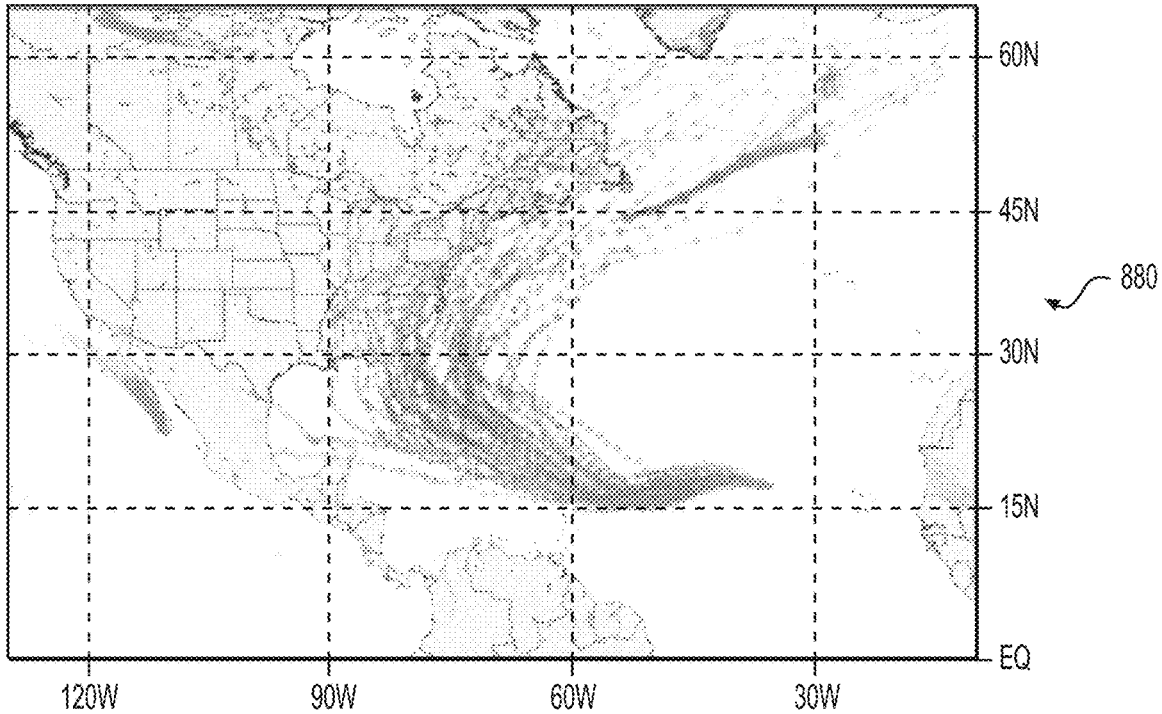

FIG. 8H illustrates chunk 880, which is a republish of an image provided by weather.us. The disconcerting image shows predicted tracks for Hurricane Irma and predicts Hurricane Irma may grow to a Category 4 or 5 storm (outlined).

FIGS. 8A-8H illustrate the diversity of data records and the diversity of data sources that may be ingested by the RTRM system 100. The tokenizer objects implemented by the mechanism 120 may operate not only to segregate possibly relevant features but also filter out at least extraneous information from the incoming data records.

Figure 4A:
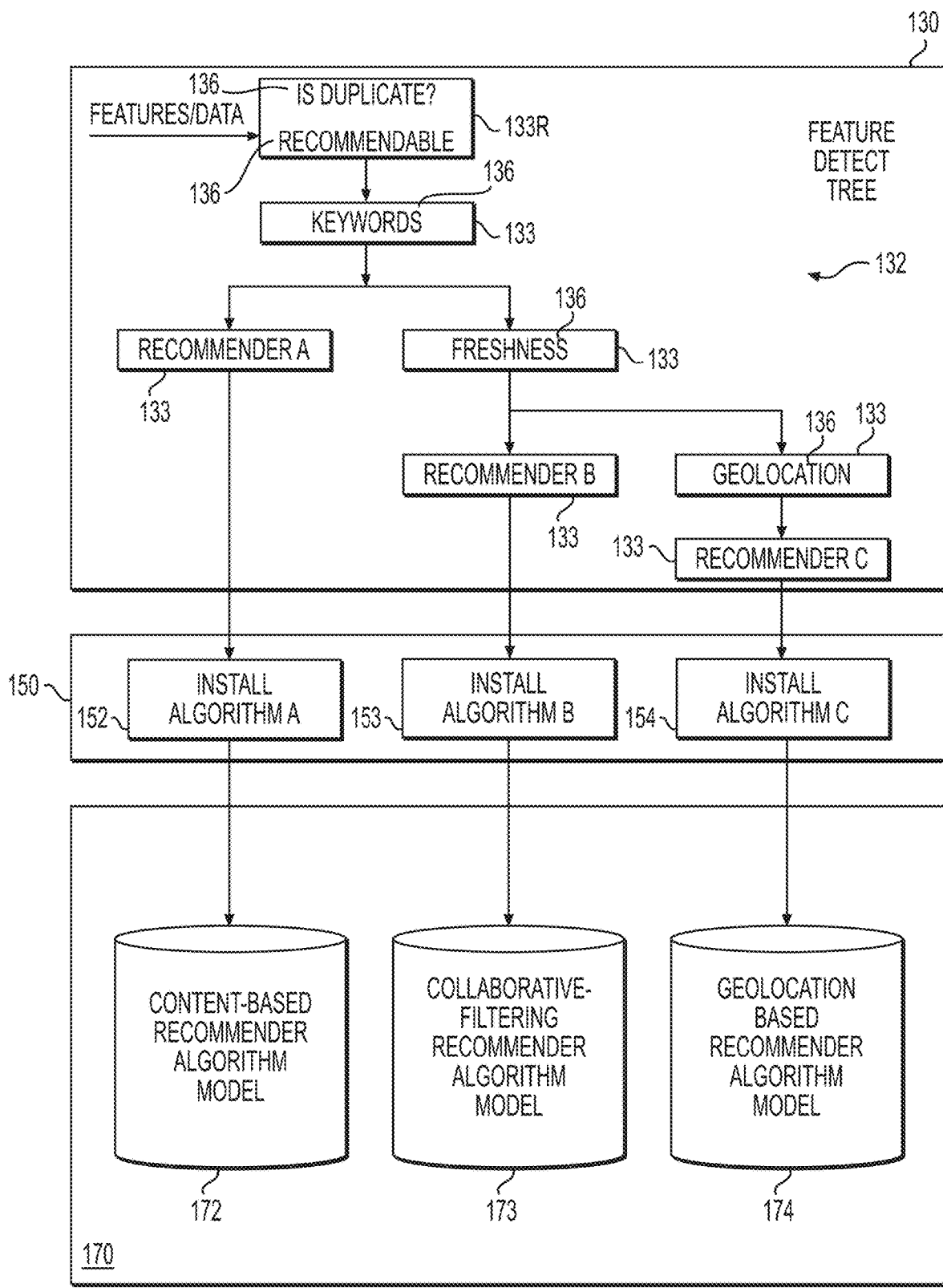
FIGS. 4A-4G illustrate components and aspects of the RTRM system of FIGS. 3A and 3B.
Figure 4B:
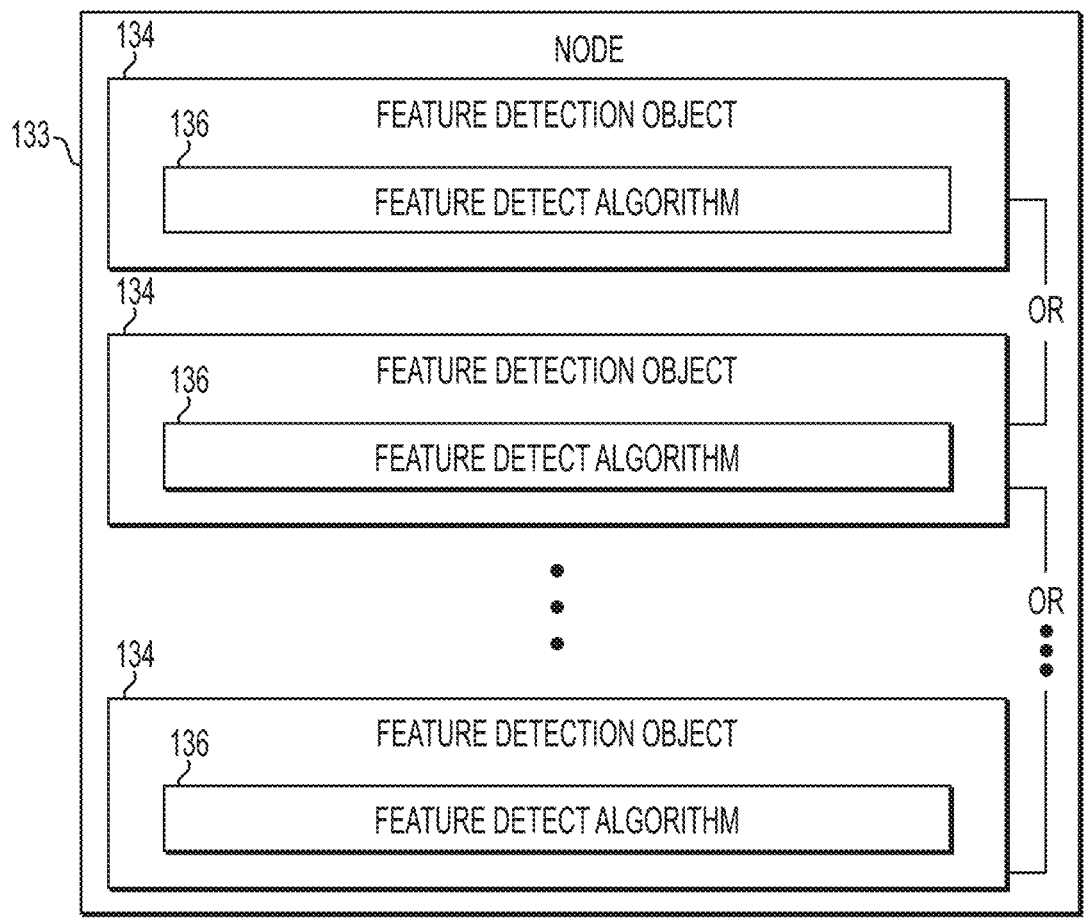

FIG. 4A shows an example feature detect mechanism 130 in more detail. To accomplish its feature filtering function, the feature detect mechanism 130 may generate a feature detect tree 132. The feature detect tree 132 includes a root node 133R and a number of branches starting at certain branch nodes 133. However, a branch may include subsequent nodes 133 that do not branch. Some branch nodes 133 define points of divergence of the feature detect tree 132; that is some branch nodes 133 may be followed by subsequent branch nodes 133. Each branch ultimately ends in a leaf node 133, that is, a node with no child or subsequent node. The root node 133R followed by one or more subsequent branch nodes 133 culminating in a leaf node 133 defines a unique feature traversal path that leads to a feature and feature data being installed in one or more recommender algorithm models 172-174. The feature detect tree 132, at the root node 133R or each branch node 133, may include feature detection objects 134 (see FIG. 4B) containing feature detect algorithms 136 that filter feature data and thereby pass only feature data that meet the requirements of the feature detect algorithms 136; i.e., the potential feature has the data required to make the feature a candidate for recommender algorithm models 172-174 in recommender algorithm component 170. The feature detection object 134 may be a small, reusable object. The stream server component 110 (see FIG. 3A) iteratively passes the data to the feature detect tree's root node 133R for processing. Traversal of the tree 132 by a feature from the root or top node to a leaf node (a node with no children) is a successful traversal for a particular recommender algorithm model and results in the feature installed or updated into the appropriate recommender algorithm model(s) with use of a feature installation objects 152-154. A feature that does not traverse from the root node to a leaf node is effectively filtered out. A feature may, for example, be selected for further traversal of the tree 132, but this prior-selected feature may be filtered out at the next, or subsequent, branch node 133 in the feature detect tree 132. A branch node 133 in the tree 132 may have none, one, or many feature detection objects 134. In one aspect, a feature would have to satisfy each of the multiple feature detection objects 134 at a specific branch node 133. In another aspect, a feature would need to satisfy only one feature detection object 134. The difference may lay in the way the feature detection objects 134 are written (e.g., a Boolean AND or a Boolean OR). FIG. 4B shows an example node 133 including OR's feature detection objects 134. Returning to FIG. 4A, the feature detect tree 132 may provide for installing or updating features in one or many recommender algorithm models. While the feature detect algorithms 136 used may be varied and complex, the structure of the tree 132 allows an operator to construct a sequence of specific-use feature detection objects, filtering out all but the desired or required features.

Figures 7E, 7F:
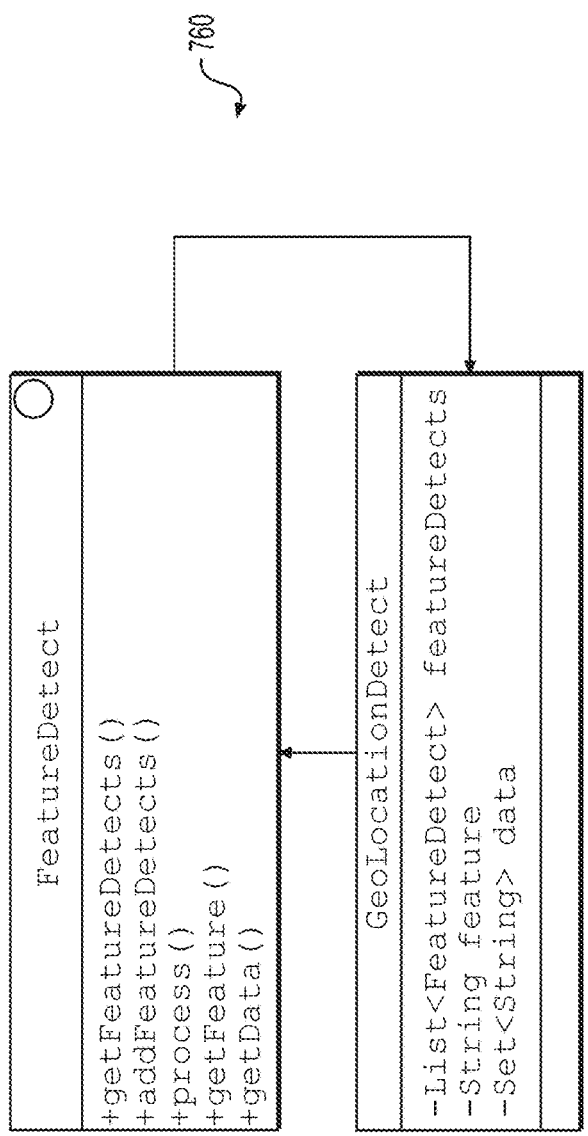

In FIG. 4B, the feature detection objects 134 may use Strategy and Composite design patterns (as well as other design patterns); each Strategy design pattern may be employed to examine a given feature, and then process (pass) or filter the feature accordingly. Use of Strategy and Composite design patterns is disclosed in detail with respect to FIGS. 7A-7E. In general, Strategy design patterns allow one of a family of algorithms to be selected on-the-fly at runtime while Composite design patterns compose zero-or-more similar objects so that the objects may be manipulated as one object. The Strategy design pattern has an interface that defines a common operation to be included in the definition of any object of the same type; that is, it defines the operations of any object that is a feature detection object 134. FIG. 7F shows a feature detection object 760 as an interface that contains the methods: getFeatureDetect( ) setFeatureDetect( ) and process( ).

The Composite design pattern defines an object that can contain other objects of the same type as itself, in a parent/child relationship. Thus, using a Composite design pattern, a feature detection object may contain 0 to many feature detection objects. When a method is called on the parent feature detection object, the parent first calls the method on every one of its child classes objects. As a result, the feature detect tree 132 may be constructed by adding additional feature detection objects 134 to an existing feature detection object 134. As can be seen in FIG. 7F, the Geolocation feature detection object 760 contains a list of feature detection objects and therefore is a feature detection object itself.

Returning to FIG. 4A, an ensemble of three recommender algorithm models 172-174 may be updated from traversal of the feature detect tree 132 by a single feature. For example, a feature that is not "a duplicate," is "recommendable," and is one of specific "keywords," may be inserted into content-based recommender model 172. If the feature also had "freshness" the feature also would be inserted into collaborative-filtering recommender model 173. If the feature also is a "geolocation" feature, the feature also would be inserted into geolocation-based recommender algorithm model 174. Thus, a single feature may be applied to several recommender algorithm models. A programmer may create or modify the tree 132 and may configure any number of feature detection objects for any number of recommender algorithm models, and a single feature and its data may be passed to any combination of recommender models as the feature traverses the feature detect tree 132 and satisfies the filtering algorithms 136 at the tree nodes 133.

Returning to the extreme weather report 800, example chunks of which are shown in FIGS. 8A-8H, the feature "Hurricane Irma" appears in chunks 810, 820, 850, and 880. The feature "Irma" appears in chunks 840, and 870. The data input and processing mechanism 120 may provide these features to the feature detect mechanism 130, which may in turn, apply each feature to the feature detect tree 132. Occurrence of "Hurricane Irma" in chunk 870, while well prior to the current extreme weather forecast (August 11 versus September 2), may be "fresh" because the feature has occurred frequently, recently; the track projection map of chunk 880 was initially posted on September 1, and also may successfully traverse the node 133 containing the "freshness" feature detect algorithm. These "Hurricane Irma" features also may successfully traverse the tree 132 to the content-based recommender model 172, unless judged "Is Duplicate."

The "Hurricane Irma" features may traverse the feature detect tree 132 to the geolocation-based model 174 when such features satisfy the model's filtering criteria, which may involve use of feature detection objects that compare geographical proximity of similar features and similar users. Such a feature detection object may be apt when considering Atlantic storms since such storms may be of much greater interest to residents (users 11) of the U.S. East Coast than they would be to residents of the West Coast.

The example RTRM system 100 is shown employing blended algorithms to handle different types of feature data. The employment of blended algorithms (models 172-174) allows the RTRM system 100 to provide accurate recommendations even in a cold start situation in which the RTRM system 100 has little or no information about a new user or little or no information relevant to an existing user (that is, the collaborative-filtering model 173 and the geolocation-based model 174 may not be able to make satisfactory recommendations when the RTM system 100 has little or no knowledge of a user, or when a well-known user exhibits a new pattern of item access). In these cold start situations, the RTRM system 100 may use the content-based model 172 to initially populate feature and user data.

Using the chunks of FIGS. 8A-8H with a new user, the RTRM system 100 may provide recommendations based on some known or definable attribute of the new user. For example, laptop computers typically come with IP addresses that have some geographical basis. Thus, a new user with a laptop computer having an IP address that conforms to the Northeast Coast of Florida may be more likely to read the extreme weather report regarding Hurricane Irma than would a new user having a laptop computer with an IP address corresponding to San Diego or Calcutta. Of course, use of IP addresses may not result in accurate recommendations since lap top computers are mobile, and a person from Calcutta may be visiting St. Augustine, in which case the person from Calcutta probably would be interested in Hurricane Irma weather reports.

Figure 4C:
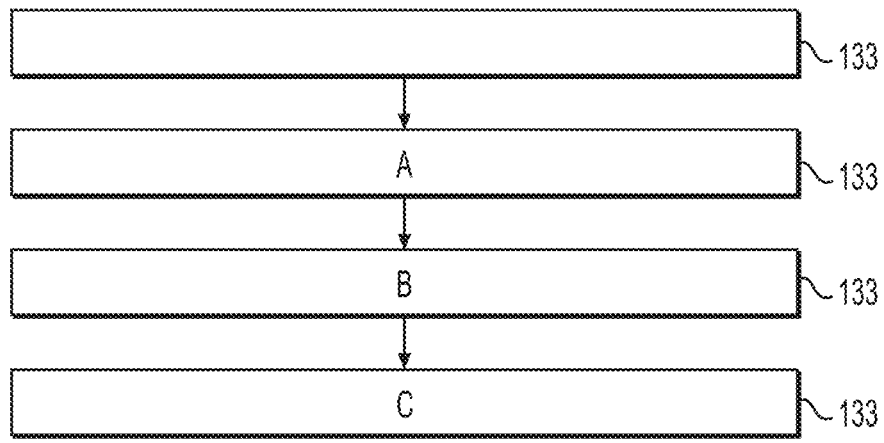
Figure 4D:
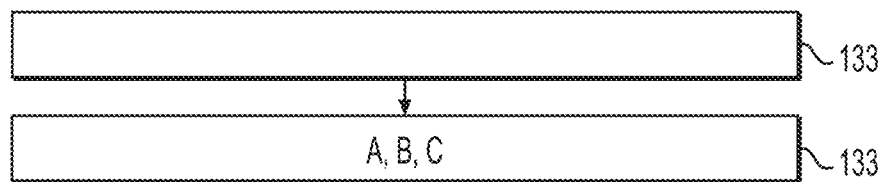

By employing design patterns such as Strategy, Composite, and other design patterns, the RTRM system 100 allows a programmer or operator to create and adapt the feature detect tree 132 by, for example, simply adding nodes and or feature detect objects to existing nodes 133. As an example, shown in FIG. 4C, three nodes A, B, C and their feature detect objects may be attached to the tree 132 as three individual nodes 133. Each new node 133 itself may hold an ordered collection of leaf or child nodes 133. The feature detect tree 132 will process each node 133 in sequence. Alternately, as shown in FIG. 4D, all three new nodes A, B, C may be added to a single existing node 133 as ordered list of nodes. In FIGS. 4C and 4D, if any of the three new nodes has additional nodes, the additional nodes will be recursively processed as well.

Figure 4E:
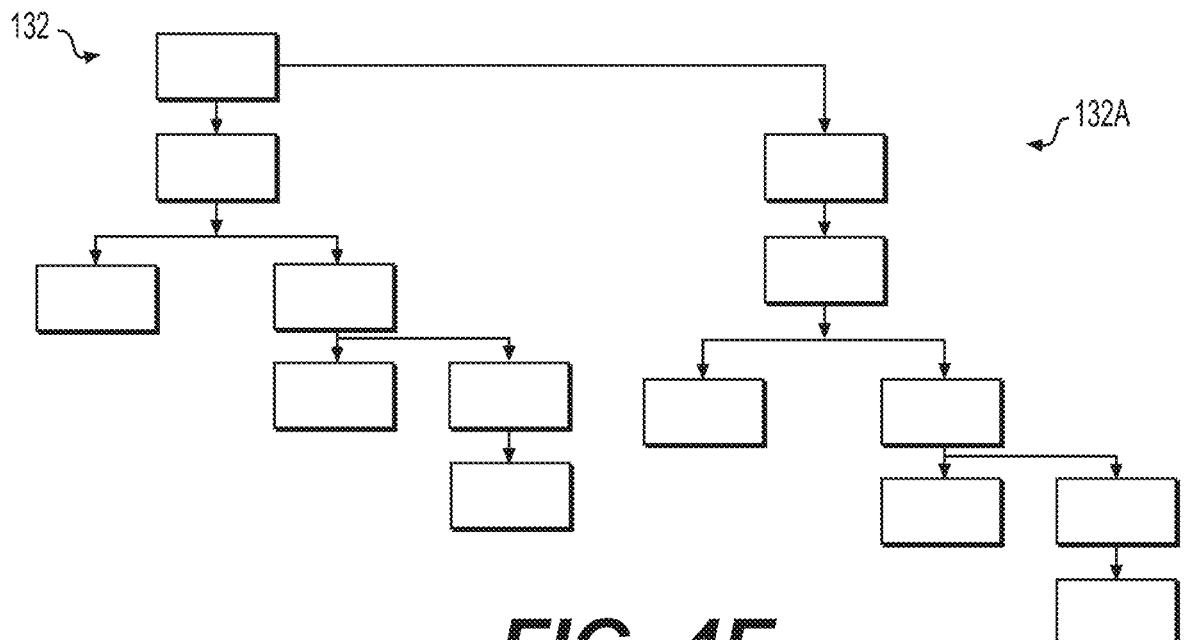

The feature detect tree 132 may support addition of an entire new feature detect tree 132A through a single node addition, as shown in FIG. 4E, by adding the root node of the new tree 132A to any existing node 133 of the tree 132. The new tree 132A could represent a set of particular feature detection objects. Additionally, the tree 132 may be modified by installing/removing the new tree 132A as dictated by the requirements of the marketing system 20. Any additions to or edits of the feature detect tree 132 would immediately be seen in recommender algorithm model(s) 172-174.

Figure 7G:
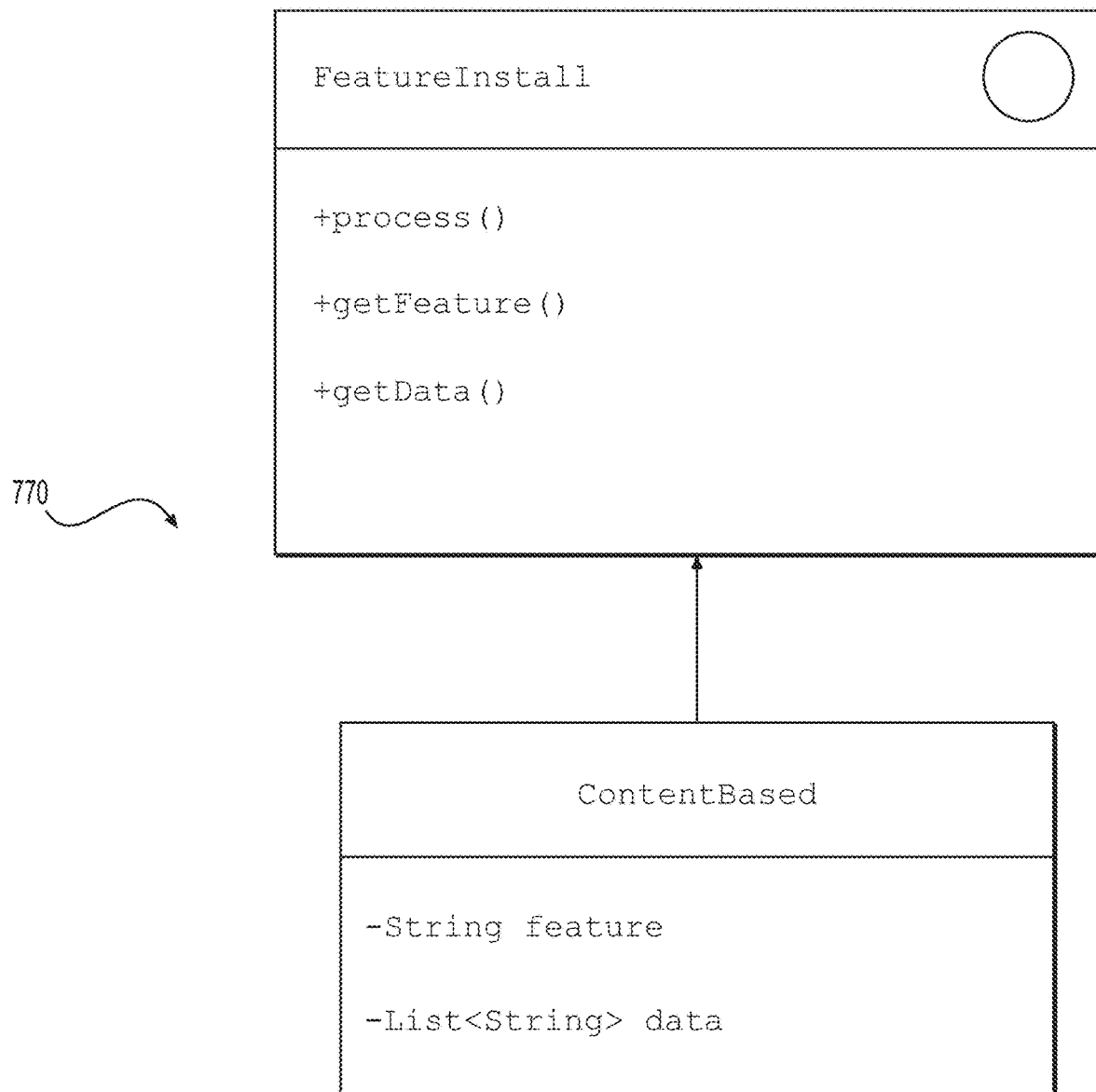

FIG. 7G illustrates a feature installation object 770 that facilitates the process of installing features and data into a recommender algorithm model. Feature installation objects may differ for every feature install concrete class and thus may represent a single recommender algorithm model insertion of data. A feature installation object encapsulates and implements a complex feature install algorithm that creates or modifies feature data in a particular recommender algorithm model. The feature installation objects are very specific to the algorithms (algorithms 152-154—see FIG. 4A) themselves and their algorithms are carefully written with a specific recommender algorithm model (models 172-174, see FIG. 4A) in mind. As with tokenizer objects and feature detection objects, a feature installation object may follow Strategy and Composite design patterns to provide a convenient modular container for such algorithms making the feature installation objects easier to create, modify, test and reuse. Because installing a feature in the recommender algorithm model may be very complex and CPU intensive, the RTRM system 100 may parallelize processing in separate threads. Feature install algorithms are located inside the feature install class so that the RTRM system 100 may abstract dynamic updating away from the recommender algorithm models 172-174 and place the feature install algorithms inside the feature install class, making testing and modifying. The feature installation objects also may log metrics for analysis through either log instrumentation or aspect-oriented software. Any log data may be spooled to file, database, memory database, etc. The feature install algorithms also may split feature data between different recommender algorithm models to test algorithmic effectiveness.

With its enhanced recommender algorithm models, an entity such as the marketing system 20 of FIG. 1A may use the RTRM system 100 to increase sales or supply of goods and services, advertisements, people, other users, companies, institutions, or other entities (i.e., items 13) to users 11 or to other entities. For example, a social networking site may use the RTRM system 100 to recommend users to other users 11. A web search engine may use the RTRM system 100 to recommend products and services to users 11. An online provider of movies may use the RTRM system 100 to recommend movies to users 11. The RTRM system 100 employs the recommender component 180 (see FIG. 3A), to provide the recommendations.

The recommender component 180 operates to provide recommendations that are relevant to the user 11 and in a manner that reduces resource requirements, such as processor and memory requirements. The recommendations are made in real-time with respect to a user's requests (i.e., user requests 97; see FIG. 1B). Thus, if a user 11 submits a search query to find a particular product, service, other user (i.e., an item 13), the recommender component 180 provides a recommendation in time for the recommendation to be provided together with the search results. The recommender component 180 also operates to update, in real-time, user attributes that may be employed in other components of the RTRM system 100 and any user feedback about recommended items 13 is taken into account in real-time. For example, a user 11 may view an extreme weather report and write a recommendation or comment in a blog associated with the extreme weather report. The recommender component 180 may provide the recommendation or comment for ingestion by the stream server component 110 (see FIG. 3A). The recommender component 180 accesses item database 102, which stores item descriptions 103. Some item descriptions 103 are only an item identifier such as a product code or other number. Other item descriptions 103 include an item identifier as well as one or more features describing the item 13, such as price, manufacturer, or other item data. The recommender component 180 also accesses the recommender algorithm models 172-174 in model database 109. The recommender algorithm models 172-174 enable a latent rating 105 (see FIG. 3B) to be predicted given a specific user 11 and an item description 103. A latent rating 105 may be an unobserved variable related to a rating RTRM system 100 predicts a user 11 would give an item 13. Given a specific user 11, the recommender component 180 in cooperation with the recommender algorithm models 172-174 may generate predicted latent ratings 105 for any of the item descriptions 103 in the item database 102. Using the predicted latent ratings 105, the recommender component 180 selects one or more of the items 13 and recommends the selected items 13 to the user 11. The selections may be made on the basis of the predicted latent ratings 105 in any suitable manner. For example, the items 13 with the top five predicted latent ratings 105 may be selected and presented to the user 11 as a ranked list.

The RTRM system 100 may employ observed user behavior related to items 13, whether the items 13 are recommended or are consumed without recommendation. For example, a user 11 may access Web site 24 to search for an Indian cookbook. The search may produce a list of available Indian cookbooks and the user 11 may select and purchase one of the listed books. The search and/or the purchase may cause the component 180 to generate a list of recommended items 13 (e.g., other ethnic cookbooks). If the user 11 makes a purchase of one of the recommended items 13, or if a user 11 clicks on a link to one of the recommended items 13, this observed user behavior or user action may be input to the RTRM system 100 as user attribute information 107. Other user information also may be input including observed or user-provided attributes. The RTRM system 100 may employ the user attribute information 107 when updating the recommender algorithm models 172-174. For each user 11, the component 180 may generate a user profile 107A. The user profile 107A may include observed user behavior, and user-provided user attributes, and other information. The user profile 107A may constitute a recognizable pattern that may be used in conjunction with the recommender algorithm models 172-174 to provide predicted latent ratings 105 for items 13. In some embodiments, sparsely active binary attributes are used and the user profile 107A still may be generated considering available user attributes for the particular user. As the user profile 107A is refined, the component 180, in cooperation with the models 172-174 may generate item recommendations based on the user profile 107A and features of items 13. In this way, a predicted latent rating 105 is obtained for a specified user 11 and item 13 pair. This process may be repeated to obtain predicted latent ratings 105 for many items 13 given a particular user 11. Employing the predicted latent ratings 105, items 13 may then be selected for recommending to the user 11.

The above process also may be employed to update in real time the recommender algorithm models 172-174 as users 11 supply new ratings, for example, without having to revisit previous data. In addition, the RTRM system 100 adapts to changes in a user's tastes or interests (as exhibited, for example, in item consumption) in real time, and even within a single user session. In addition, the RTRM system 100 accounts for the effect of a user's preferences and an item's popularity changing with time. Finally, as shown for example in FIG. 4G, the RTRM system 100 may leverage parallel data and processing structures to maintain real time updating even when processing large data feeds. This architecture also minimizes the effects of cold start problems.

More specifically, the RTRM system 100 architectures allows efficient recommender performance in different cold start situation, including when a first-time user 11 accesses and/or consumes an item 13, and when a well-known user 11 accesses and/or consumes an item 13 that differs significantly from previously consumed items 13, or the well-known user 11 suddenly exhibits behavior differing significantly from previously observed and recorded behavior for that user 11. A real-time recommender method of the RTRM system 100 includes the recommender component 180, in cooperation with the recommender algorithm models 172-174, determining if sufficient information exists for a specific user 11. In the first situation, involving a first-time user 11, the recommender component 180 may determine that the only information available for the first-time user 11 is a session ID established when the first-time user 11 logs onto Web site 24. However, the first-time user 11 likely will navigate the Web site 24 and may submit a search query, review (consume) an item 13 such as a severe weather report or take other observable action that may be employed by one or more of the recommender algorithm models 172-174, in particular, the content recommender algorithm model 172. If sufficient information still is not available, the recommender component 180 may provide recommendations that have a high latent rating 105 considering other users 11 and/or other first-time users 11. Otherwise, the recommender component 180 may wait until sufficient information becomes available. In the second situation in which a well-known user suddenly exhibits behavior significantly different from that associated with the user's profile 107A, the sudden, significantly different behavior (or user action) may be consuming or requesting an item 13 significantly different from items 13 previously consumed or requested, or items 13 recommended to the well-known user 11. For example, a well-known user 11 from Haifa may have a history of buying only Russian novels (in Hebrew) from the marketing system 20. The same well-known user 11 unexpectedly (to the recommender component 180) purchases a set of snow tires in July from the marketing system 20. Should the recommender component 180 recommend more Russian novels or a snow shovel? Have any other Haifa residents bought snow tires from marketing system 20? Has Haifa ever experienced snow? (it has, but little and rarely). Consumption of the snow tires may provide the RTRM system 100 with sufficient information to cause the recommender component 180 to recommend items 13 related to snowing conditions. In either situation, sufficient information may be item descriptions corresponding to one or more consumed items 13 or one or more requested items 13 indicated in a user action, with each item description including at least one feature currently installed in one or more recommender algorithm models 172-174 of the RTRM system 100.

Figure 4F:
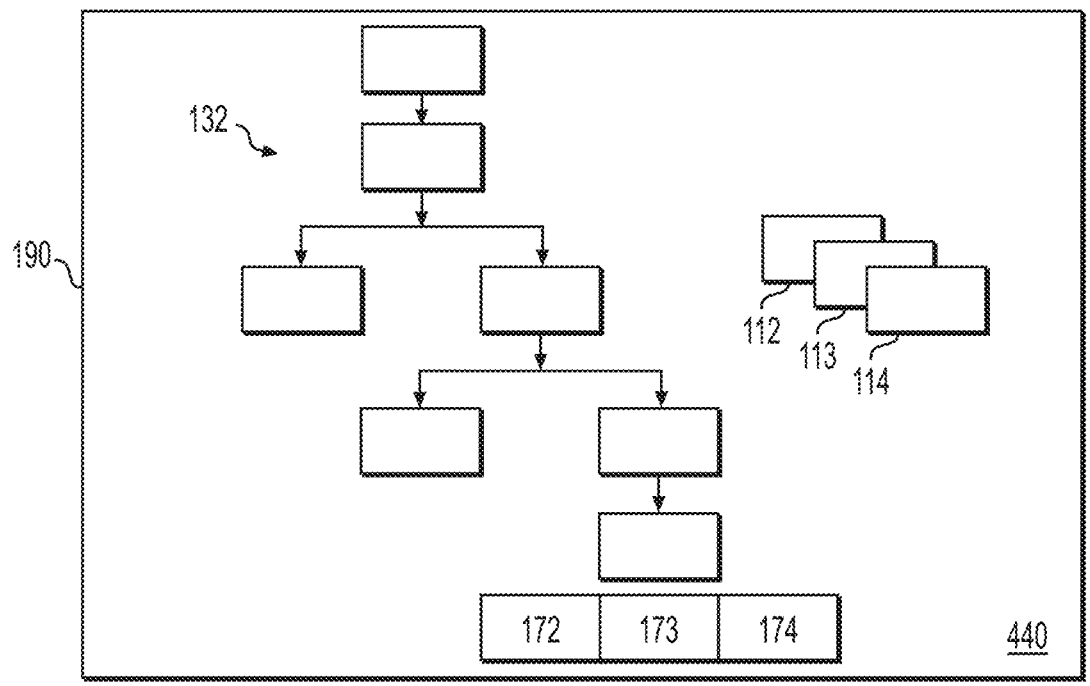

The Admin/Operator pages (i.e., interfaces 190) shown in FIG. 4F constitute an interface 440 that allows an operator to build or edit the feature detect tree 132 from a Web page. The operator may change the logic of the feature detect tree 132 by adding, moving or deleting feature detection objects and feature installation objects 112-114. The interface 440 may be used to split data such as for training and testing data for different recommender algorithm models 172-174. The operator also may use the interface 440 to view data analytics, recommender analytics, etc.

Figure 4G:
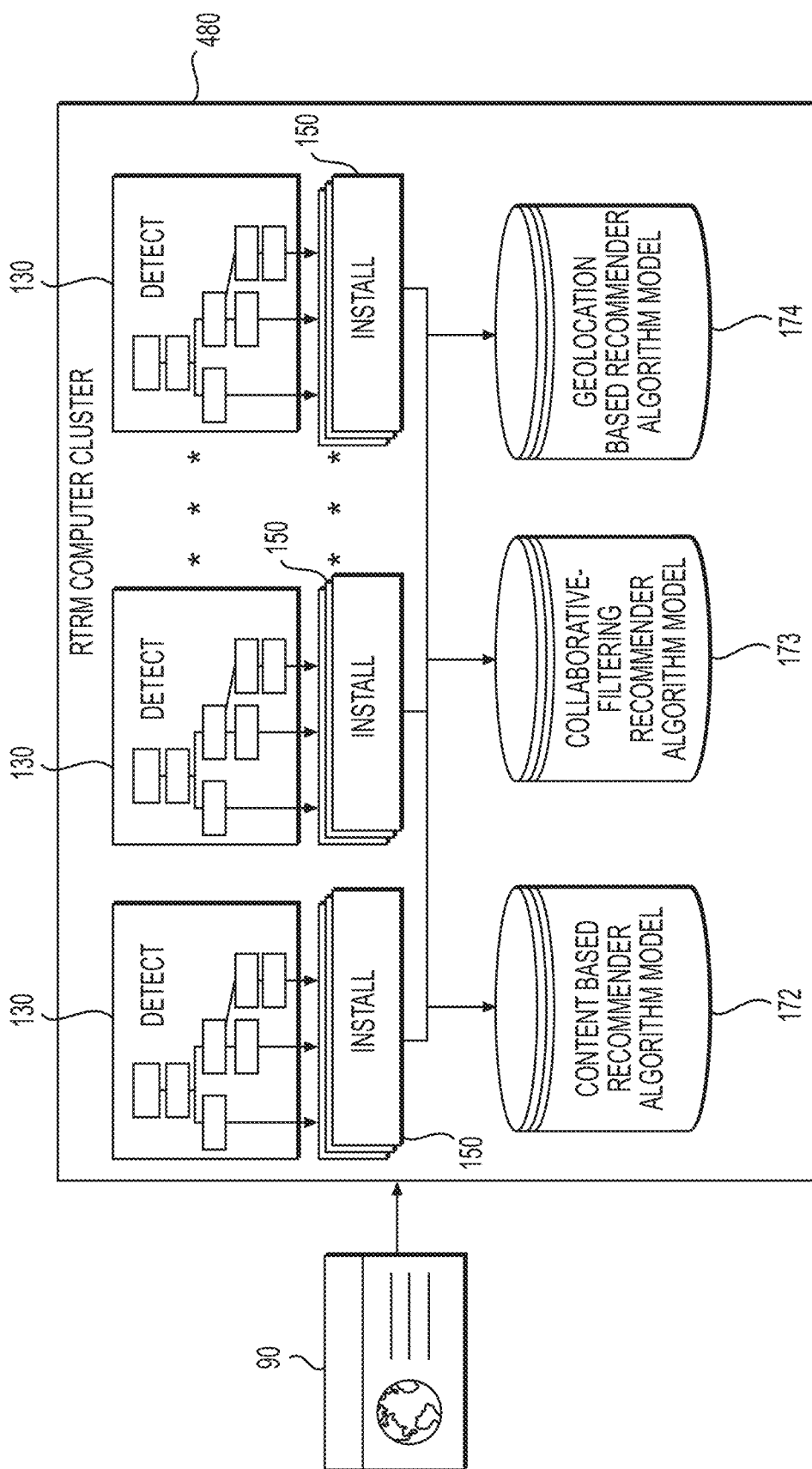

To further improve performance, the RTRM recommender concepts disclosed herein may be implemented using a cluster stream architecture. FIG. 4G illustrates an example cluster stream architecture 480, and such architecture 480 may be particularly useful for very high-volume data feeds such as Twitter feeds or satellite video feeds, for example.

Figure 5:
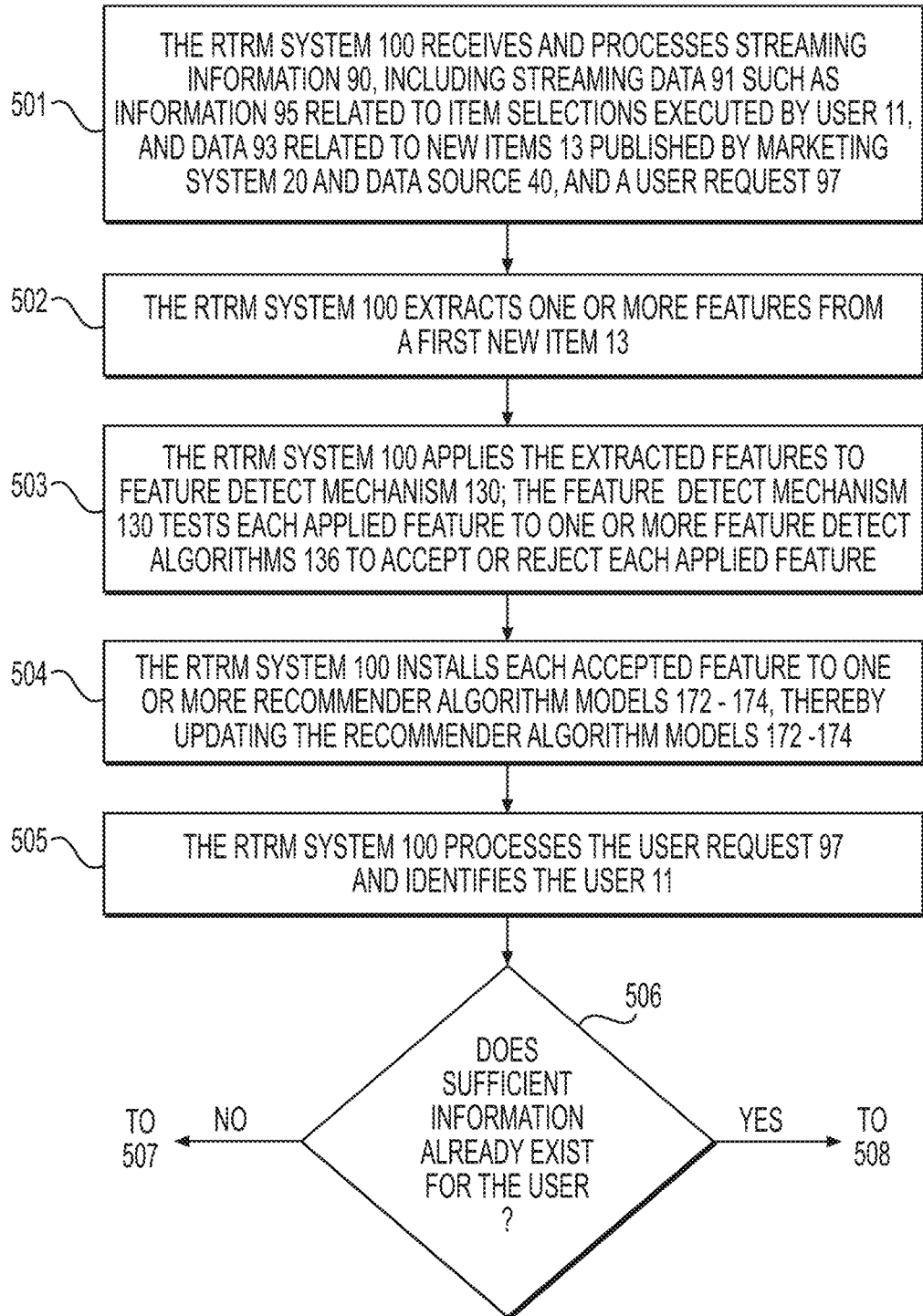
FIG. 5 is a flowchart illustrating an example operation of the RTRM system of FIGS. 3A and 3B.
Figure 5:
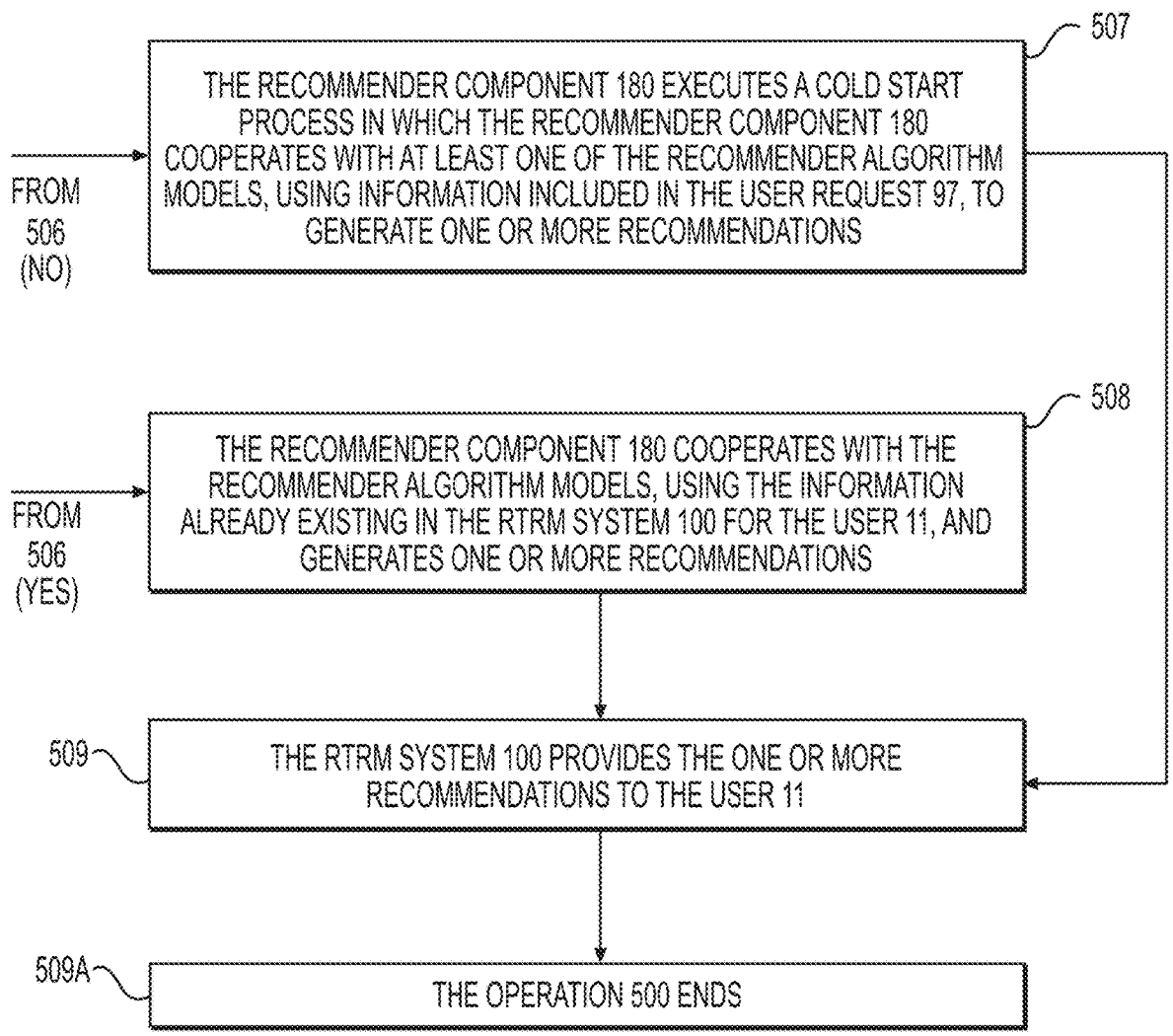

FIG. 5 is a flowchart illustrating an example operation of the RTRM system 100 of FIGS. 3A and 3B and its components shown in FIGS. 4A-4G, in the environment 10 of FIG. 1A. In FIG. 5, example operation 500 begins in block 501 with the RTRM system 100 receiving and beginning the processing of the streaming data 90, including streaming data 91 such as user feedback 95 related to item selections executed by user 11 (i.e., a user action), and data records 93 related to new items 13 published by marketing system 20 and data source 40, and a user request 97. In block 502, the RTRM system 100 processes the streaming data 91 to extract one or more features from a first new item 13. In block 503, the RTRM system 100 applies the extracted features to feature detect mechanism 130. The feature detect mechanism 130 tests each applied feature to one or more feature detect algorithms 136 to accept or reject each applied feature. In block 504, the RTRM system 100 installs each accepted feature to one or more recommender algorithm models 172-174, thereby updating the recommender algorithm models 172-174. In block 505, the RTRM system 100 processes the user request 97, and identifies the user 11. In block 506, the recommender component 180 determines if sufficient information already exists in the RTRM system 100 for the user 11, in the current user action, or in the user request 97. In block 506, if sufficient information does not exist in the RTRM system 100, the current user action, or the user request 97 for the user 11, the operation 500 moves to block 507 and the recommender component 180 executes a cold start process in which the recommender component 180 cooperates with at least one of the recommender algorithm models, using information included in the current user action and the user request 97, and attempts to generate one or more recommendations. In block 506, if sufficient information exists in the RTRM system 100, the current user action, and/or the user request 97, the operation 500 moves to block 508 and the recommender component 180 cooperates with the recommender algorithm models, using the information already existing in the RTRM system 100 for the user 11, as well as information in the current user action and user request 97, and generates one or more recommendations. Following either block 507 or 508, the RTRM system 100 provides the one or more recommendations (if any) to the user 11, block 509. The operation 500 then ends, block 509A.

FIGS. 6A-6E are flowcharts illustrating in more detail, example operation 500 of FIG. 5 by the RTRM system 100 of FIG. 3A and its components shown in FIGS. 4A-4G. In general, the operation includes a processor receiving streaming data from a plurality of streaming data sources, the streaming data having one or more data records, each data record having data and meta data; the processor, in real-time, applying one or more tokenizer objects to a received data record, including identifying one or more data elements in data of a data record and in meta data of the data record and extracting and buffering the one or more data elements. The operation further includes the processor, in real-time, applying each of the one or more buffered data elements to a feature detect tree, the feature detect tree comprising a root node and one or more subsequent branch nodes, a set of the one or more subsequent branch nodes comprising a path culminating in a leaf node, the operation by applying a data element to the root node of the feature detect tree and testing the data element to reject or select the data element, applying a prior-selected data element to one or more subsequent branch nodes of one or more paths of the feature detect tree, and conducting at each of the one or more subsequent branch nodes, a test to reject or select the prior-selected data element, and stopping, for a selected path, the applying and testing after the prior-selected data element reaches a path's leaf node. The operation still further includes the processor, installing, in real-time, each data element reaching the path's leaf node, as a feature, into one or more recommender algorithm models.

Figure 6A:
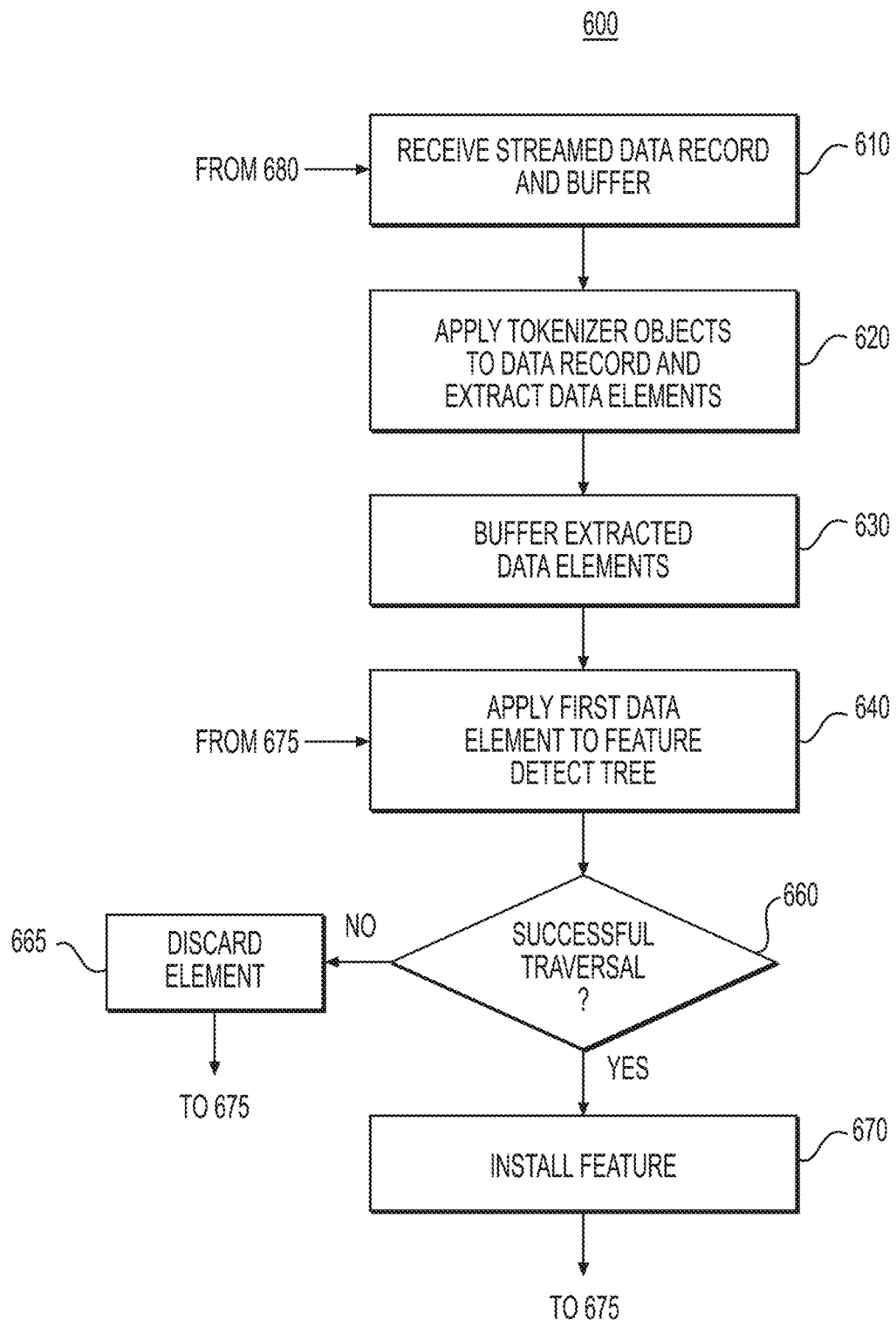
FIGS. 6A-6F are flowcharts illustrating example operations of the RTRM system of FIGS. 3A and 3B.
Figure 6A:
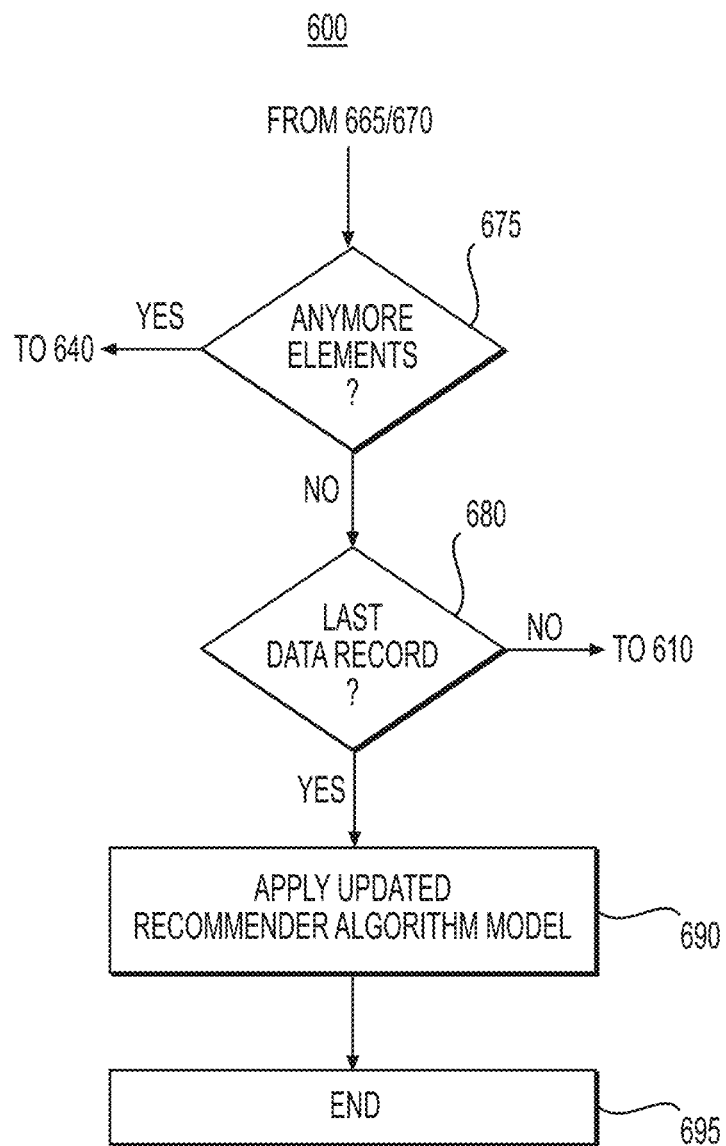

FIG. 6A illustrates operation 600 of the RTRM system 100 considering information received in a streamed data record associated with an item 13. In block 610, operation 600 begins when the RTRM system 100 receives the streamed data record (or data record chunk or string) and buffers the data record (or data record chunk or string). The input and processing mechanism 120 executes to identify the data record source and type of data record (e.g., text, video, or combinations of types), and apply an appropriate reader object to read the data record.

In block 620, the mechanism 120 applies a data record parsing unit to identify and segregate data elements from the received data record. The elements may be derived from the data record itself or from meta data associated with the data record. In an embodiment, the parsing unit may be a string tokenizer or a stream tokenizer. In an aspect, the tokenizers may identify and segregate the data record using defined delimiters such as punctuation marks, or simply by using white spaces between elements. In another aspect, the tokenizers may identify and segregate the elements using a set of keywords or phrases. In yet another aspect, a combination of tokenizers may be used to identify and segregate elements. In yet another aspect, a Strategy/Composite design pattern may be used to define tokenizer objects that identify and segregate the elements. Furthermore, the operation of block 620 may be applied to the data record one chunk at a time. At the conclusion of block 620, the RTRM system 100 may have produced a set of candidate features that may be applied to the feature detect tree 132. Following block 620, the operation 600 moves to block 630.

In block 630, the candidate features thus extracted from the data record may be buffered temporarily in storage layer 122 as features. Following block 630, the operation 600 moves to block 640.

In block 640, the feature detect mechanism 130 selects a first feature and applies the first feature to the root node 133R of feature detect tree 132. The feature then begins the process of traversing the feature detect tree 132. If at any node 133, the feature does not answer true, the feature is discarded. The operation of block 640 is shown in more detail in FIG. 6C. In block 660, the mechanism 130 determines if the feature successfully traversed the feature detect tree 132. If the feature traverses the entire feature detect tree 132, the operation 600 moves to block 670. Otherwise, the feature is discarded, block 665. Following block 665, operation 600 moves to block 675.

In block 670, the feature install component 150 installs the feature into the appropriate recommender algorithm models 172-174. To minimize CPU load and to maintain operation 600 in real-time, the installation may involve a multi-thread process for each recommender algorithm model. Following block 670, the operation 600 moves to block 675.

In 675, the RTRM system 100 determines if another feature from the same data record is available for an attempted tree transversal. If another feature is available, operation 600 returns to block 640. If another feature is not available, operation 600 moves to block 680.

In block 680, the RTRM system 100 determines if the currently processed data record is the last available data record. If the currently processed data record is the last available data record, the operation 600 moves to block 690. If the currently processed data record is not the last available data record, the operation 600 returns to block 610.

In block 690, the RTRM system 100 applies the newly updated recommender algorithm models 172-174 to make predictions or recommendations of items 13 to users 11. Example operations of block 690 are disclosed in more detail with respect to FIG. 6F. Following block 690, the operation 600 ends, block 695.

Figure 6B:
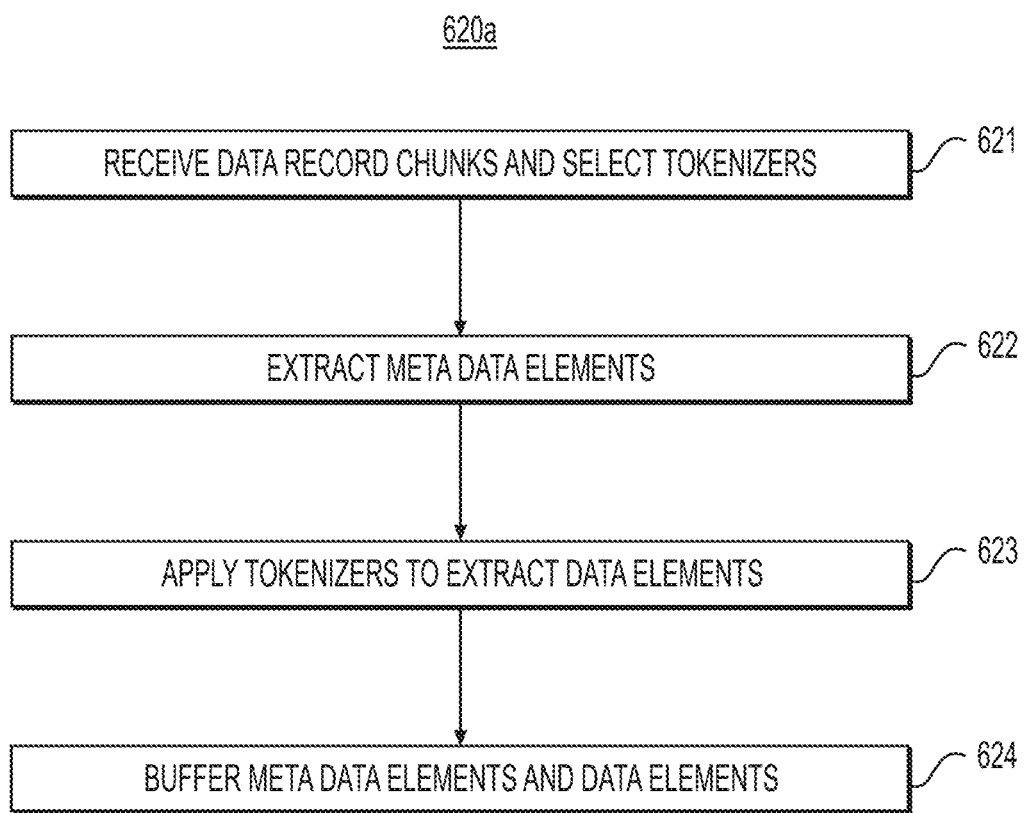

FIG. 6B illustrates the example operation of block 620 in more detail. In operation 620a, block 621, the feature input and processing mechanism 120 receives elements read during the operation of block 610 and selects tokenizers that may be appropriate for the type of data record and the elements within the data record. Some elements may be meta data elements, such as the date and time of broadcast of the data record, the type of data record, and the source of the data record. Such meta data elements may be segregated by a specific tokenizer and buffered in storage layer 122 along with an identification of the data record, block 622. In block 623, the mechanism 120 applies a selection of String-Tokenizers and/or StreamTokenizers to segregate data record elements as possible features that may be input to the recommender algorithm models. The data record may be read line by line or chunk by chunk, and the corresponding tokenizers are applied to the lines or chunks, accordingly. Some chunks may be text only; other chunks may be text and other data objects such as images, audio data, and video data. The tokenizers execute to segregate elements depending on their specific operation statement. For example, a StreamTokenizer may be written to identify the keyword "Hurricane" (capitalized) or to find nine letter words starting with "H". In block 624, metadata and data may be buffered.

Figure 6C:
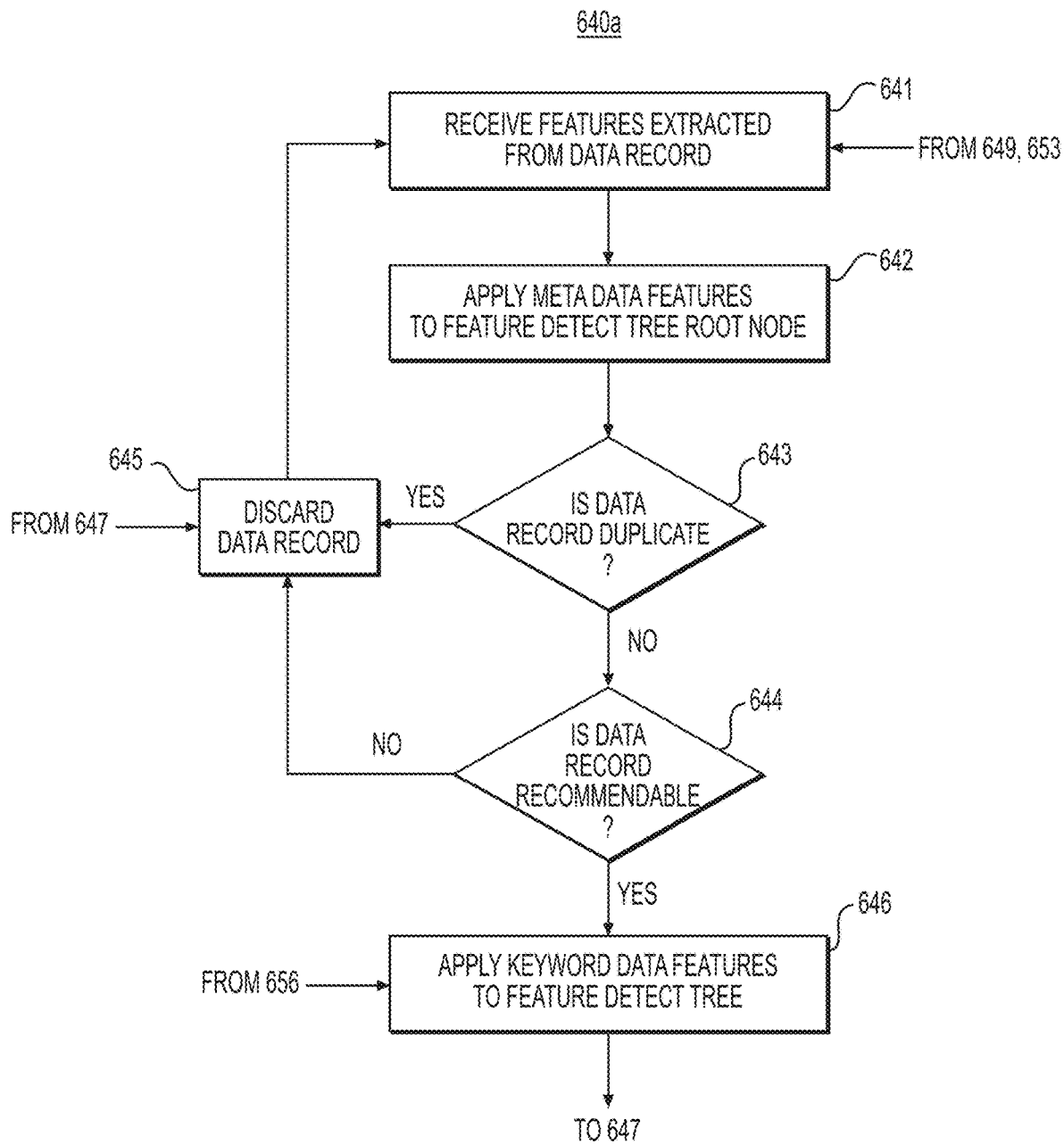
Figure 6C:
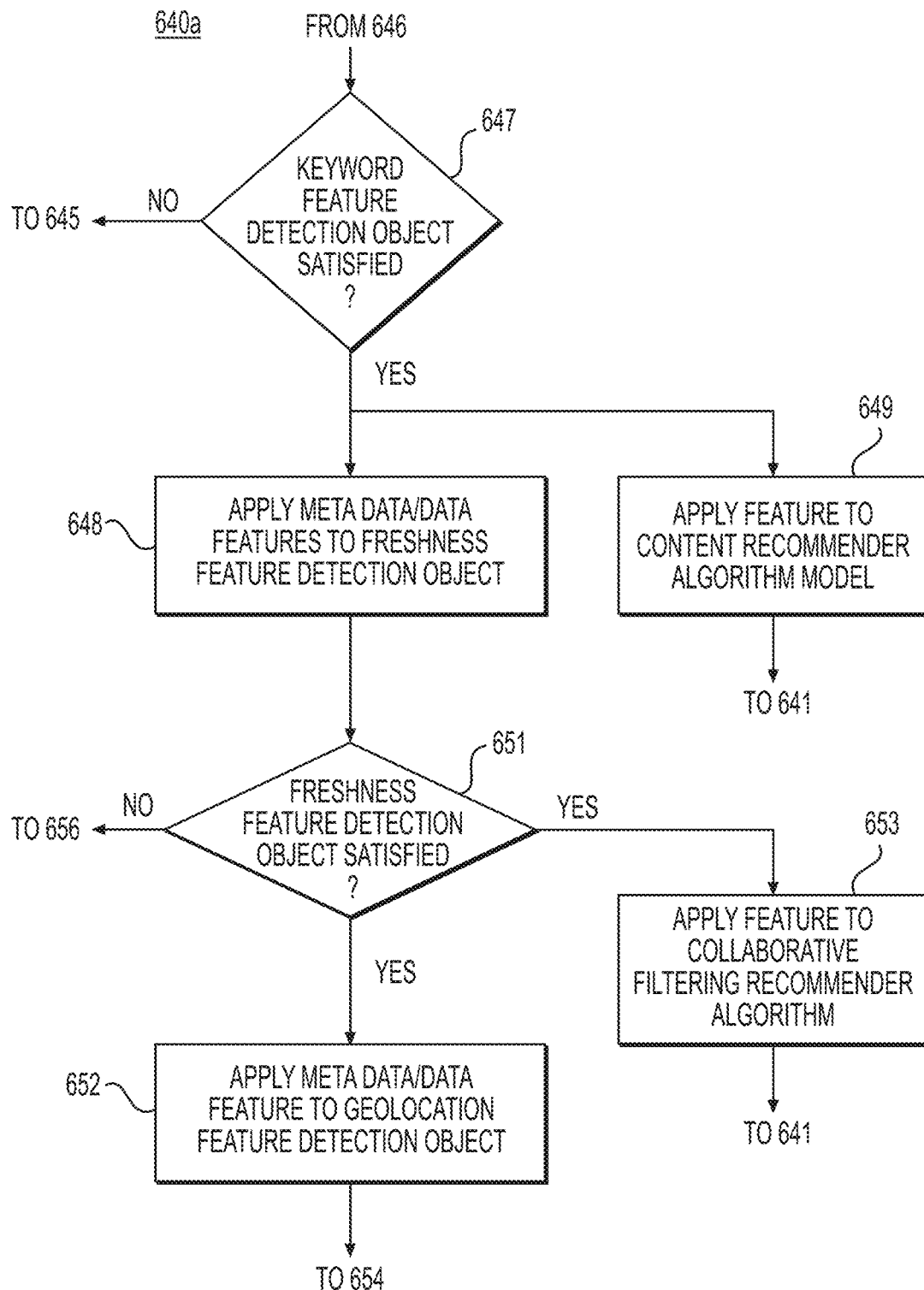
Figure 6C:
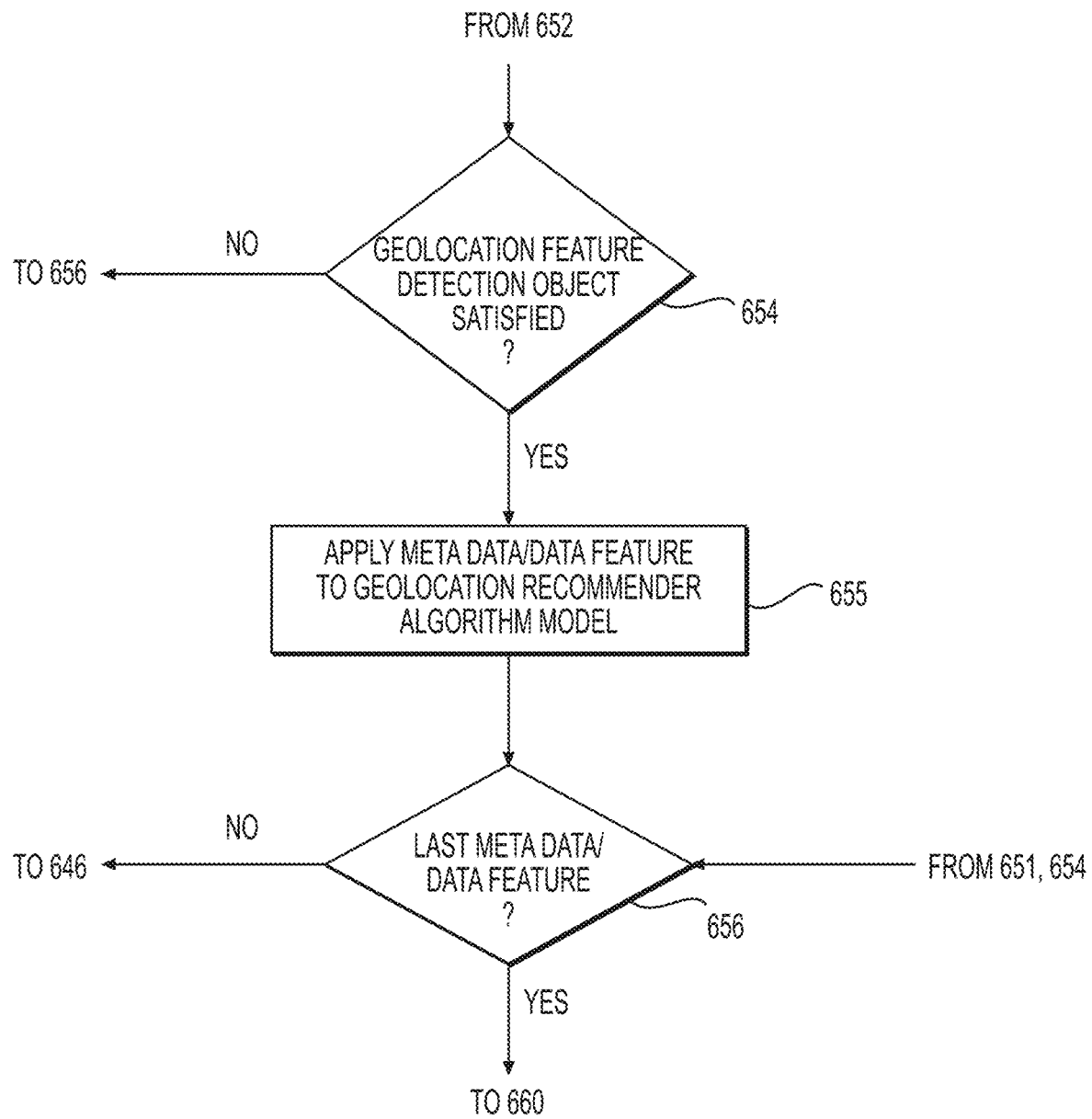

FIG. 6C illustrates the example operation of block 640 in more detail. In FIG. 6C, operation 640a begins in block 641 when the mechanism 130 receives features extracted from the item 13. In block 642, the mechanism 130 applies one or more first features, which may be meta data features, to the feature detect tree 132. In an example, the meta data features may include the identification of the data record or item 13. The data record identification may be used in a feature detect algorithm to determine if the item/feature is or is not a duplicate of an item/feature already processed through the feature detect tree 132. Also at the root node 133R, a feature detect algorithm may be used to determine if the non-duplicate item/feature is recommendable. An item 13 may not be recommendable if the item 13 no longer is available from the source of the data record. However, even an item 13 that is available may not be recommendable. For example, an item 13 may have been viewed and rated by many users, with no "likes" or now star ratings over one star, and the "recommendable" feature detect algorithm may, therefore, factor out the item 13. Note that in the example of block 642, the feature detect algorithms are not applied to any elements related to the content of the item 13 (or data record). However, other root nodes could include such feature detect algorithms. In blocks 643 and 644, the mechanism 130 determines if the meta data features of the item 13 (data record) satisfied the feature detect algorithms of the root node 133R. If the meta data features both satisfy the feature detect algorithms of the root node, the operation 640a moves to block 646. Otherwise, the operation 640a moves to block 645 and ends for the specific item 13 (data record) with the data record being discarded. The operation then returns to block 641. In block 646, the mechanism 130 applies a "keyword" feature detection object. The "keyword" feature detection object may be written using a Strategy/Composite design pattern that addresses a number of keywords. In block 647, if the feature is one of the specific "keywords," the operation 640a moves to blocks 648 and 649. Otherwise, the operation 640a moves to block 645. In block 648, the RTRM system 100 applies the meta data/data features to the freshness feature detection object. For example, the keyword "Cape Verde Islands" may not have "freshness" because that keyword feature has been used sporadically or infrequently in recent items 13. However, "Hurricane Irma" would have "freshness" precisely because it has not been used in any recent items 13 (extreme weather reports) but is an allowable name for an Atlantic hurricane. Thus, a feature may be "fresh" for several reasons including if it is a new feature or if it has been used frequently recently. The "freshness" operation of block 648 is shown in more detail in FIG. 6E. In block 649, the system 100 applies the selected keyword feature from block 647 to the content recommender algorithm model 172. Following block 649, operation 640a moves to block 641. Following block 648, operation 640a moves to block 651. In block 651, the mechanism 130 determines if the feature satisfies the freshness feature detection object. If the freshness feature detection object is not satisfied, operation 640a moves to block 656. If the freshness feature detection object is satisfied, operation 640a moves to blocks 651 and 653. In block 652, the mechanism 130 applies the meta data/data feature to the geolocation feature detection object. In block 653, the mechanism 130 applies the feature satisfying block 651 to the collaborative filtering recommender algorithm 173. Following block 653, operation 640a moves to block 641. Following block 652, operation 640a moves to block 654. In block 654, if the feature satisfies the geolocation detection object, the operation 640a moves to block 655. Otherwise, the operation 640a moves to block 656. In block 655, the feature is inserted into geolocation-based recommender algorithm model 174. Thus, a single feature may be applied to several recommender algorithm models. In block 656, the mechanism 130 determines if additional features are available from the data record. If additional features are available, the operation 640a returns to block 646. Otherwise, the operation 640a moves to block 660.

Figure 6D:
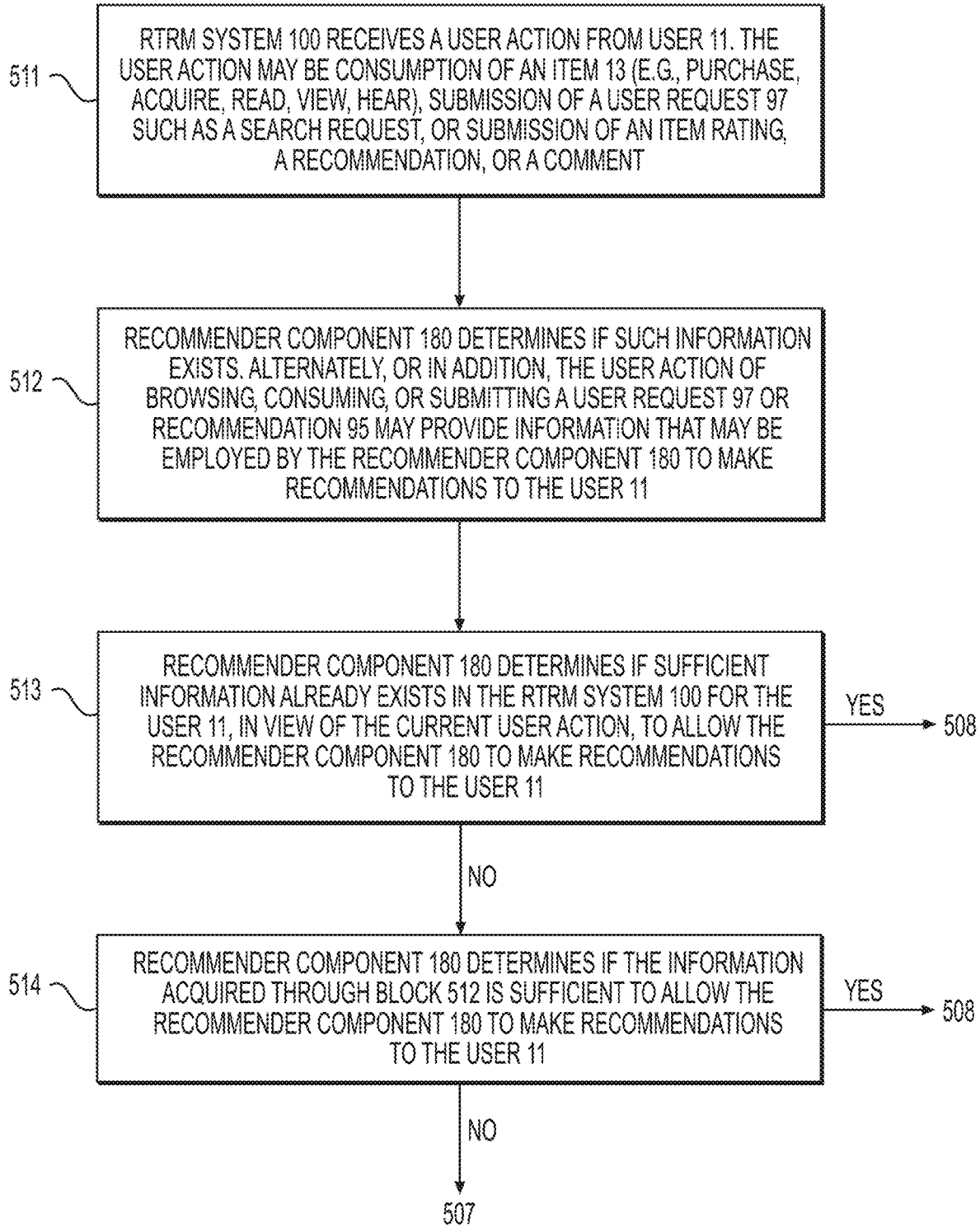

FIG. 6D illustrates example cold start operations of FIG. 5, blocks 506 and 507 in detail. In FIG. 6D, example cold start operation 511a begins in block 511 when the RTRM system 100 receives a user action from user 11. The user action may be consumption of an item 13 (e.g., purchase, acquire, read, view, hear), submission of a user request 97 such as a search request, or submission of an item rating, a recommendation, or a comment, for example. In a more specific example, a user 11 may access Web site 24 and submit a search request to look for a specific product. Most user actions will involve some means for identifying the user 11. For example, the user may navigate a browser 15 to a specific Web page 26. The processor 34 may have loaded cookies into the browser 15, and thus may identify the browser 15 as previously having accessed the Web site 24. This and other identification means may be used by the recommender component 180 to determine if a user profile 107A exists for the user 11, or if the RTRM system includes any other user information specific to the user 11. Thus, in block 512, the recommender component 180 determines if such information exists. Alternately, or in addition, the user action of browsing, consuming, or submitting a user request 97 or feedback 95 may provide information that may be employed by the recommender component 180 to make recommendations to the user 11. In block 513, the recommender component 180 determines if sufficient information already exists in the RTRM system 100 for the user 11, in view of the current user action, to allow the recommender component 180 to make recommendations to the user 11. If not, operation 511a moves to block 514. In block 514, the recommender component 180 determines if the information acquired through block 512 is sufficient to allow the recommender component 180 to make recommendations to the user 11. In either block 513 or 514, a determination of sufficient information may include determining if item descriptions corresponding to one or more consumed items or one or more requested items indicated in the current user action include at least one feature currently installed in one or more recommender algorithm models 172-174 of the RTRM system 100. If sufficient information is available in either block 513 or 514, operation 511a moves to block 508, FIG. 5. If sufficient information is not available as determined in block 514, the operation 511a moves to block 507, FIG. 5, and a cold start process is executed. Note that the operation 511a may determine a cold start condition exists even for a well-known user 11 having a user profile 107A if the current user action executed by the user 11 is sudden and sufficiently different from information contained in the user profile 107A.

Figure 6E:
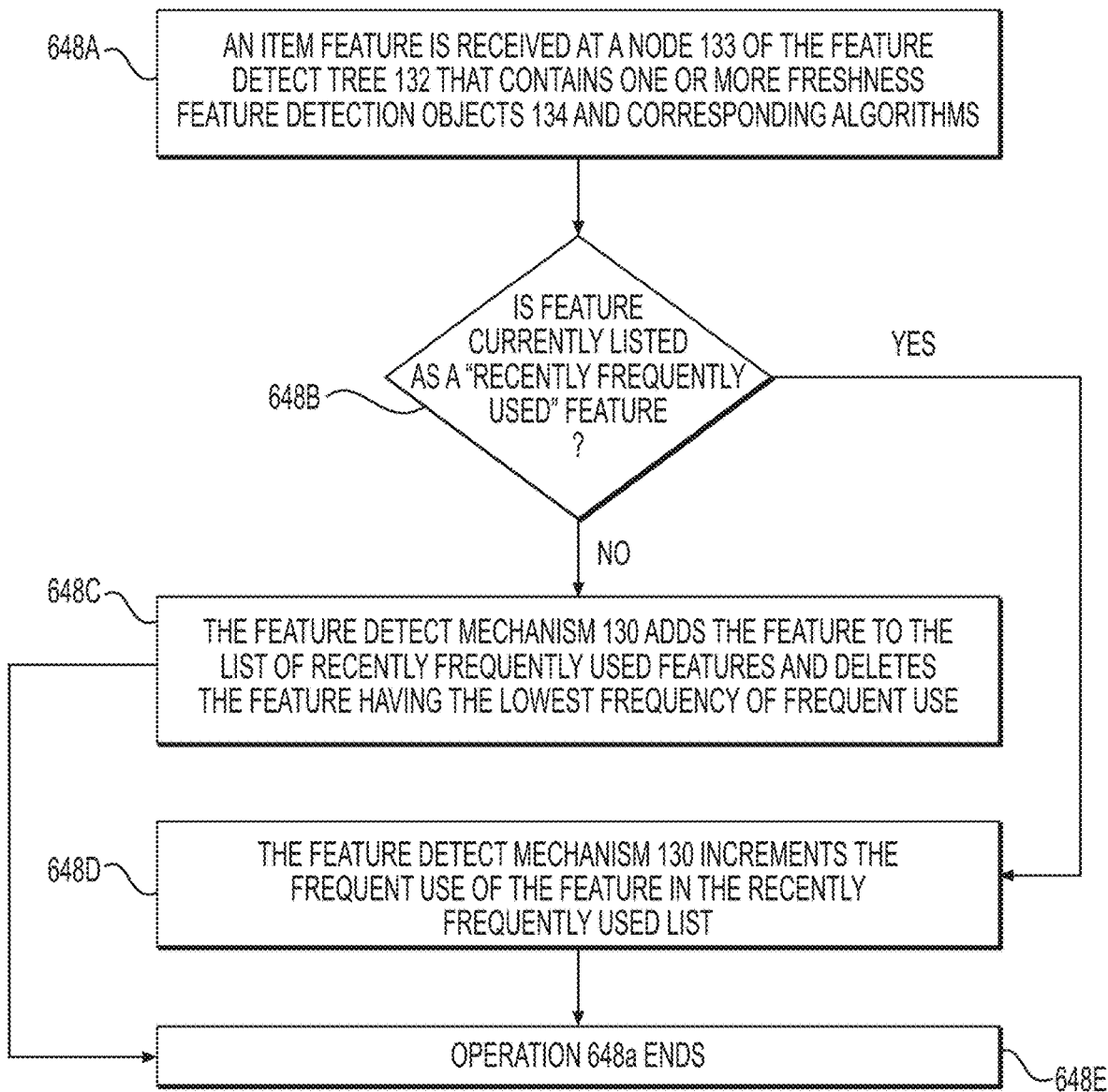

FIG. 6E illustrates example "freshness" operations of block 648 in more detail. In FIG. 6E, operation 648a begins in block 648A when an item feature is received at a node 133 of the feature detect tree 132 that contains one or more freshness feature detection objects 134. For example, a freshness feature detection object 134 receives a feature related to the extreme weather report 800 for Hurricane Irma. In an aspect, the node 133 may have, or may access, a list of recently frequently used features. In block 648B, the freshness detect algorithm 136 encapsulated in object 134 executes to determine if the feature is currently listed as a "recently frequently used" feature. If the feature is not currently listed, operation 648a moves to block 648C. If the feature is currently listed, the operation 648a moves to block 648D. In block 648C, the feature detect mechanism 130 adds the feature to the list of recently frequently used features and deletes the feature having the lowest frequency of frequent use. In block 648D, the feature detect mechanism 130 increments the frequent use of the feature in the recently frequently used list. The operation 648a then ends, block 648E.

Figure 6F:
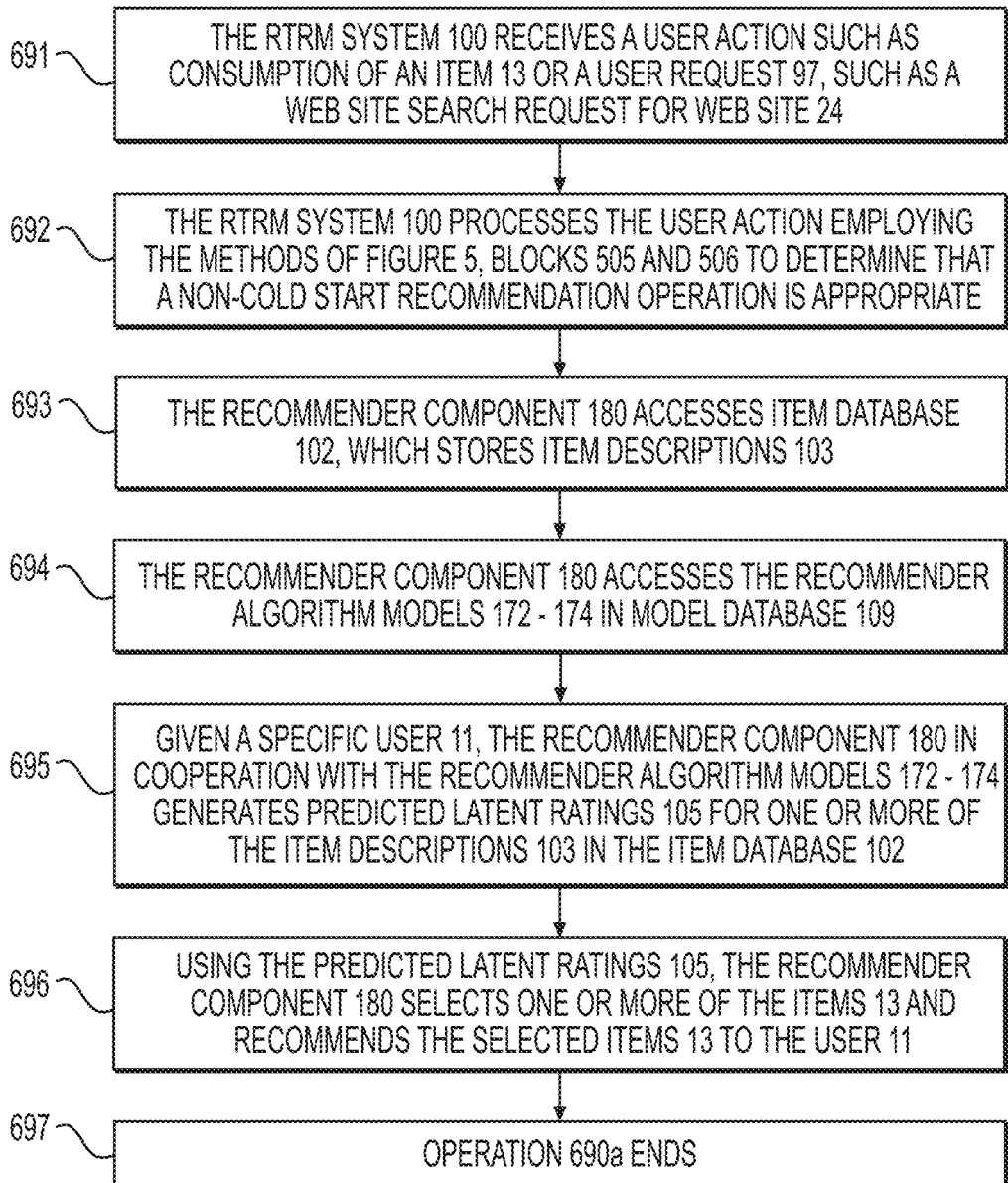

FIG. 6F illustrates the operation of block 690 in detail. In FIG. 6F, operation 690a begins in block 691 when the RTRM system 100 receives a user action such as consumption of an item 13 or a user request 97, such as a Web site search request for Web site 24. In block 692, the RTRM system 100 processes the user action employing the methods of FIG. 5, blocks 505 and 506 to determine that a non-cold start recommendation operation is appropriate. In block 693, the recommender component 180 accesses item database 102, which stores item descriptions 103. In block 694, the recommender component 180 accesses the recommender algorithm models 172-174 in model database 109. In block 695, given a specific user 11, the recommender component 180 in cooperation with the recommender algorithm models 172-174 generates predicted latent ratings 105 for one or more of the item descriptions 103 in the item database 102. In block 696, using the predicted latent ratings 105, the recommender component 180 selects one or more of the items 13 and recommends the selected items 13 to the user 11. The selections may be made on the basis of the predicted latent ratings 105 in any suitable manner. For example, the items 13 with the top five predicted latent ratings 105 may be selected and presented to the user 11 as a ranked list. Following block 696, the operation 690a ends, block 697.

Figure 9:
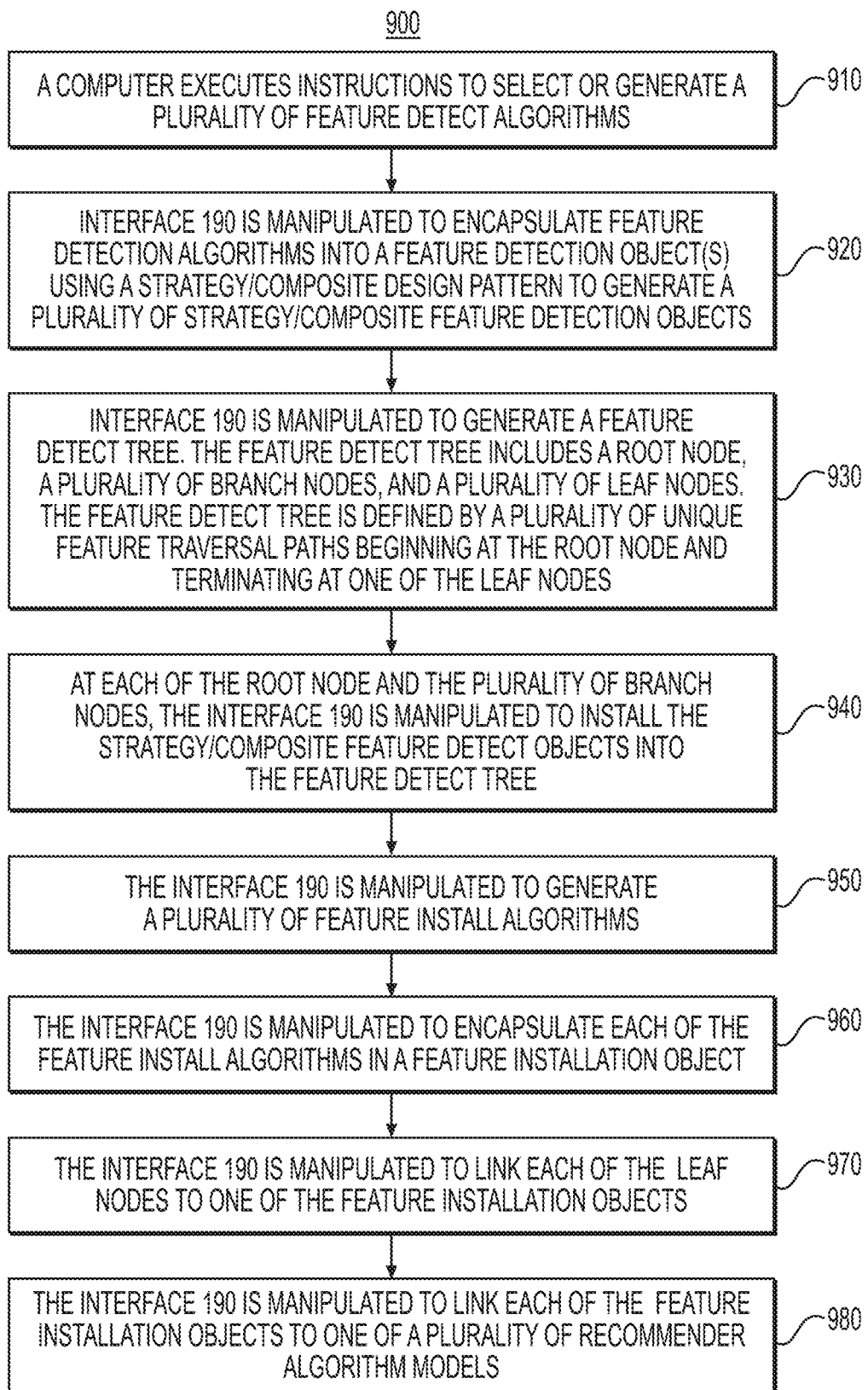
FIG. 9 is a flowchart illustrating an example operation of the RTRM system of FIGS. 3A and 3B.

FIG. 9 Illustrates a real-time recommender modeling operation executed using the interface 190 shown in FIG. 4F. In FIG. 9, operation 900 begins in block 910 when a computer executing instructions to select or generate a plurality of feature detect algorithms. In block 920, an operator manipulates the interface 190 to encapsulate feature detect algorithms into a feature detection object(s) using a Strategy/Composite design pattern to generate a plurality of Strategy/Composite feature detection objects. In block 930, the operator manipulates the interface 190 to generate a feature detect tree. The feature detect tree includes a root node, a plurality of branch nodes, and a plurality of leaf nodes. The feature detect tree is defined by a plurality of unique feature traversal paths beginning at the root node and terminating at one of the leaf nodes. In block 940, at each of the root node and the plurality of branch nodes, the interface 190 is manipulated to install the Strategy/Composite feature detection objects into the feature detect tree. In block 950, the interface 190 is manipulated to generate a plurality of feature install algorithms and in block 960 to encapsulate each of the feature install algorithms in a feature installation object. In block 970, the interface 190 is manipulated to link each of the leaf nodes to one of the feature installation objects. Finally, in block 980, the interface 190 is manipulated to link each of the feature installation objects to one of a plurality of recommender algorithm models.

Certain of the devices shown in FIGS. 1A-4G include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the embodiments represented in FIGS. 5-6E and 9. The disclosed devices, components, and systems contemplate using or implementing any suitable technique for performing the steps illustrated. Thus, FIGS. 5-6E and 9 are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A real-time recommendation system, comprising:
   a processor; and
   a non-transitory, computer-readable storage medium having encoded thereon instructions that when executed by the processor, cause the processor to:
   receive data from one or more data sources, the received data comprising one or more data records, each data record related to an item,
   identify, in real-time, one or more features in data of a data record, and
   extract and buffer the one or more identified features;
   apply, in real-time, one or more of the buffered features to a feature detect mechanism, the feature detect mechanism comprising:
   one or more feature detect algorithms; and
   one or more recommender algorithms,
   wherein the one or more feature detect algorithms are encapsulated in a feature detection object, and the feature detection object is a Strategy/Composite feature detection object comprising a plurality of Strategy design patterns; and
   wherein the processor operates to:
   reject a feature in response to failures of the feature to match at least one of the plurality of Strategy design patterns, and
   in real time, select and install features that match one or more of the Strategy design patterns into one or more recommender algorithms.

2. The system of claim 1, wherein the feature detect mechanism comprises a feature detect tree, the feature detect tree comprising a root node and one or more subsequent branch nodes, a set of the root node and the one or more subsequent branch nodes comprising a path beginning with the root node and culminating in a leaf node, and wherein to reject or install a feature, the processor:

applies the feature to the root node of the feature detect tree and conducts a first test of the feature to reject or select the feature, applies a feature selected at the root node to the one or more subsequent branch nodes of one or more selected paths of the feature detect tree, and conducts at each of the one or more subsequent branch nodes, a subsequent test to reject or further select the feature, and stops, for a selected path, the applying and testing after the further selected feature reaches the selected path's leaf node.

3. The system of claim 2, wherein each of the root node and each of the branch nodes comprises one or more feature detect algorithms.

4. The system of claim 3, wherein a subsequent node is a branch node for a first path of the feature detect tree and for a second path, leads directly to a leaf node.

5. The system of claim 4, wherein the Strategy/Composite feature detection object employs a logical AND Composite design pattern, wherein the Strategy/Composite feature detection object rejects features in response to failures of the features to match all of the plurality of Strategy design patterns.

6. The system of claim 3, wherein each path of the feature detect tree leads to a specific recommender algorithm model and a corresponding feature install class, wherein the feature install class installs a selected feature into the specific recommender algorithm model to which the selected feature corresponds.

7. The system of claim 6, wherein the corresponding feature install class is a multi-threaded feature detection object.

8. The system of claim 3, wherein a feature traverses all paths of the feature detect tree to all leaf nodes of the feature detect tree and is installed as a feature in all recommender algorithm models connected to the feature detect tree.

9. The system of claim 1, wherein the features are chosen from a group consisting of key word elements, key phrase elements, freshness elements, geolocation elements, and preference elements.

10. The system of claim 9, wherein features chosen from the freshness elements comprise features selected based on a least recently used method, wherein the processor:
rejects a feature corresponding to a least recently used feature in a list of recently used features, and
selects a feature not appearing in the list of recently used features, wherein the processor:
adds the selected feature to the list of recently used features, and
deletes the least recently used feature from the list of recently used features, wherein the least recently used feature comprises a feature recently used the least.

11. The system of claim 1, wherein a Strategy design pattern comprises an interface that defines a common operation of the feature detection object.

12. The system of claim 1, wherein the Strategy/Composite feature detection object comprises a plurality of feature detection objects of a same type in a parent/child relationship.

13. A real-time recommendation method, comprising:
processor receiving data from one or more data sources, the received data comprising one or more data records, each data record related to an item;
identifying, in real-time, one or more features in data of a data record;
extracting and buffering the one or more identified features;
applying, in real-time, one or more of the buffered features to a feature detect mechanism, the feature detect mechanism comprising:
one or more feature detect algorithms, and
one or more recommender algorithms;
wherein the one or more feature detect algorithms are encapsulated in a feature detection object, and the feature detection object is a Strategy/Composite feature detection object comprising a plurality of Strategy design patterns; and
wherein the processor:
rejects a feature in response to failures of the feature to match at least one of the plurality of Strategy design patterns, and
in real time, selects and installs features that match one or more of the Strategy design patterns into one or more recommender algorithms.

14. The method of claim 13, wherein the feature detect mechanism comprises a feature detect tree, the feature detect tree comprising a root node and one or more subsequent branch nodes, a set of the root node and the one or more subsequent branch nodes comprising a path beginning with the root node and culminating in a leaf node, and wherein to reject or install a feature, the method further comprising:
applying the feature to the root node of the feature detect tree and conducts a first test of the feature to reject or select the feature,
applying a feature selected at the root node to the one or more subsequent branch nodes of one or more selected paths of the feature detect tree, and conducting at each of the one or more subsequent branch nodes, a subsequent test to reject or further select the feature, and
stopping, for a selected path, the applying and testing after the further selected feature reaches the selected path's leaf node.

15. The method of claim 14, wherein each of the root node and each of the branch nodes comprises one or more feature detect algorithms.

16. The method of claim 15, wherein a subsequent node is a branch node for a first path of the feature detect tree and for a second path, leads directly to a leaf node.

17. The method of claim 16, wherein the Strategy/Composite feature detection object employs a logical AND Composite design pattern, wherein the Strategy/Composite feature detection object rejects features in response to failures of the features to match all of the plurality of Strategy design patterns.

18. The method of claim 15, wherein each path of the feature detect tree leads to a specific recommender algorithm model and a corresponding feature install class, wherein the feature install class installs a selected feature into the specific recommender algorithm model to which the selected feature corresponds.

19. The method of claim 18, wherein the corresponding feature install class is a multi-threaded feature detection object.

20. The method of claim 13, wherein a feature traverses all paths of the feature detect tree to all leaf nodes of the feature detect tree and is installed as a feature in all recommender algorithm models connected to the feature detect tree.

21. The method of claim 13, wherein the features are chosen from a group consisting of key word elements, key phrase elements, freshness elements, geolocation elements, and preference elements.

22. The method of claim 21, wherein features chosen from the freshness elements comprise features selected based on a least recently used method, the method further comprising:
rejecting a feature corresponding to a least recently used feature in a list of recently used features, and
selecting a feature not appearing in the list of recently used features, comprising:
adding the selected feature to the list of recently used features, and
deleting the least recently used feature from the list of recently used features, wherein the least recently used feature comprises a feature recently used the least.

23. The method of claim 13, wherein a Strategy design pattern comprises an interface that defines a common operation of the feature detection object.

24. The method of claim 13, wherein the Strategy/Composite feature detection object comprises a plurality of feature detection objects of a same type in a parent/child relationship.

25. The method of claim 13, wherein identifying one or more features comprises applying one or more tokenizer objects to a received data record.

26. The method of claim 13, wherein identifying one or more features comprises applying a natural language processor to a received data record.

27. The method of claim 13, wherein insufficient user-related information for a user seeking a recommendation is available, the method further comprising:
selecting recommendations having high latent ratings considering one or more previous first-time users; and
presenting to the user a list of n recommendations having a high latent rating, wherein n is greater than or equal to 1.

28. A method for generating a feature detection mechanism, comprising:
a processor accesses a plurality of feature detection algorithms;
the processor encapsulating one or more of the plurality of feature detection algorithms into a feature detection object using one or more Strategy/Composite design patterns to generate a plurality of Strategy/Composite feature detection objects, each of the plurality of Strategy/Composite feature detection objects comprising a plurality of Strategy design patterns;
the processor generating a feature detect tree, the feature detect tree comprising a root node, a plurality of branch nodes, and a plurality of leaf nodes, the feature detect tree defined by a plurality of unique feature traversal paths beginning at the root node, moving to one or more subsequent branch nodes, and terminating at one of the leaf nodes;
at each of the root node and the plurality of branch nodes, the processor installing one of more of the Strategy/Composite feature detection objects;
the processor executing instructions to generate a plurality of feature install algorithms;
the processor encapsulating each of the feature install algorithms in a feature installation object;
the processor linking each of the leaf nodes to one of the feature installation objects; and
the processor linking each of the feature installation objects to one of a plurality of recommender algorithm models.

29. The method of claim 28, further comprising modifying the feature detect tree by inserting at one or more of the branch nodes, a second root of a second feature detect tree, the second feature detect tree comprising a plurality of second branch nodes and second leaf nodes, the second feature detect tree redefining at least one of the unique feature traversal paths.

30. The method of claim 28, wherein the one or more feature detect algorithms are encapsulated in a feature detection object, and the feature detection object is a Strategy/Composite feature detection object employing a logical AND Composite design pattern, and wherein the Strategy/Composite feature detection object rejects features in response to failures of the features to match each of the plurality of Strategy design patterns.

31. The method of claim 28, wherein the one or more feature detect algorithms are encapsulated in a feature detection object, and the feature detection object is a Strategy/Composite feature detection object employing a logical NOR Composite design pattern, and wherein the Strategy/Composite feature detection object rejects features in response to failures of the features to match any one of the plurality of Strategy design patterns.

32. The method of claim 28, wherein each path of the feature detect tree leads to a specific recommender algorithm model and a corresponding feature install class, wherein the feature install class is written to install the feature into the specific recommender algorithm model to which the feature install class corresponds.

* * * * *